(12) United States Patent
Paillet et al.

(10) Patent No.: US 8,478,081 B2
(45) Date of Patent: Jul. 2, 2013

(54) MONOLITHIC IMAGE PERCEPTION DEVICE AND METHOD

(75) Inventors: Guy Paillet, Corte Madera, CA (US); Anne Menendez, Penngrove, CA (US)

(73) Assignees: AGC Flat Glass North America, Inc., Alpharetta, GA (US); Norlitech, LLC, Petaluma, CA (US)

( * ) Notice: Subject to any disclaimer, the term of this patent is extended or adjusted under 35 U.S.C. 154(b) by 383 days.

(21) Appl. No.: 12/880,964

(22) Filed: Sep. 13, 2010

(65) Prior Publication Data

US 2011/0052011 A1    Mar. 3, 2011

Related U.S. Application Data

(63) Continuation-in-part of application No. 11/477,571, filed on Jun. 30, 2006, now Pat. No. 7,796,841.

(60) Provisional application No. 60/694,988, filed on Jun. 30, 2005.

(51) Int. Cl.
*G06K 7/00*    (2006.01)

(52) U.S. Cl.
USPC .......................................................... 382/312

(58) Field of Classification Search
USPC .................. 382/159, 165, 170, 181, 187, 312
See application file for complete search history.

(56) References Cited

U.S. PATENT DOCUMENTS

| | | | |
|---|---|---|---|
| 5,621,863 A | 4/1997 | Boulet et al. | |
| 5,701,397 A | 12/1997 | Steimle et al. | |
| 5,710,869 A | 1/1998 | Godefroy et al. | |
| 5,717,832 A | 2/1998 | Steimle et al. | |
| 5,740,326 A | 4/1998 | Boulet et al. | |
| 6,160,729 A | 12/2000 | Jung et al. | |
| 6,221,687 B1 | 4/2001 | Abramovich | |
| 6,332,137 B1 | 12/2001 | Hori et al. | |

(Continued)

FOREIGN PATENT DOCUMENTS

| CA | 2 149 478 A1 | 1/1996 |
|---|---|---|
| CA | 2 149 479 C | 1/1996 |

(Continued)

OTHER PUBLICATIONS

The Third Chinese Office Action, issued in Chinese Patent Application No. 200680031521.7 on Feb. 14, 2012, including English language translation, 5 pages.

(Continued)

*Primary Examiner* — Gregory F Cunningham
(74) *Attorney, Agent, or Firm* — Rothwell, Figg, Ernst & Manbeck, P.C.

(57) ABSTRACT

The present invention is directed to an apparatus which can acquire, readout and perceive a scene based on the insertion, or embedding of photosensitive elements into or on a transparent or semi-transparent substrate such as glass or plastic. The substrate itself may act as the optical device which deflects the photons of an incident image into the photosensitive elements. A digital neural memory can be trained to recognize patterns in the incident photons. The photosensitive elements and digital neural memory elements may be arranged with light elements controlled in accordance with the patterns detected. In one application, intelligent lighting units provide light while monitoring surroundings and/or adjusting light according to such surroundings. In another application, intelligent displays display images and/or video while monitoring surroundings and/or adjusting the displayed images and/or video in accordance with such surroundings.

24 Claims, 15 Drawing Sheets

U.S. PATENT DOCUMENTS

| | | | |
|---|---|---|---|
| 6,606,614 | B1 | 8/2003 | Paillet et al. |
| 7,019,391 | B2 | 3/2006 | Tran |
| 7,242,449 | B1 | 7/2007 | Yamazaki et al. |
| 7,333,963 | B2* | 2/2008 | Widrow et al. ............ 706/18 |
| 7,488,950 | B2 | 2/2009 | Mouttet |
| 7,643,203 | B2 | 1/2010 | Gousev et al. |
| 7,834,413 | B2 | 11/2010 | Tanaka |
| 2004/0211960 | A1 | 10/2004 | Joo et al. |
| 2007/0014469 | A1 | 1/2007 | Paillet et al. |
| 2009/0004746 | A1* | 1/2009 | Sriyudthsak et al. ......... 436/2 |
| 2009/0175509 | A1 | 7/2009 | Gonion et al. |

FOREIGN PATENT DOCUMENTS

| | | | |
|---|---|---|---|
| CN | 1 213 144 A1 | | 9/1998 |
| CN | 1540570 A | | 10/2004 |
| EP | 0 694 852 A1 | | 1/1996 |
| EP | 0 694 853 A1 | | 1/1996 |
| EP | 0 694 854 A1 | | 1/1996 |
| EP | 0 694 855 A1 | | 1/1996 |
| EP | 0 526 504 B1 | | 1/1997 |
| EP | 0893915 A2 | | 1/1999 |
| JP | 63-161680 A | | 7/1988 |
| JP | 08-171540 A | | 7/1996 |
| JP | 08-171541 A | | 7/1996 |
| JP | 08-171542 A | | 7/1996 |
| JP | 08-171543 A | | 7/1996 |
| JP | 08-069445 A | | 12/1996 |
| JP | 10333605 A | * | 12/1998 |
| JP | 2005-167090 A | | 6/2005 |
| KR | 164943 B1 | | 1/1999 |

OTHER PUBLICATIONS

Dudek, Piotr et al., "A General-Purpose Processor-per-Pixel Analog SIMD Vision Chip," IEEE Tansactions on Circuits and Systems, 52(1): 13-20 (Jan. 2005).

Korean Office Action issued in Korean Patent Application No. 2008-7002422, dated Jul. 19, 2012 with translation (8 pages).

Cat et al., "SIMPil: An OE Integrated SIMD Architecture for Focal Plane Processing Applications," 1996, Proceedings of MPPOI '96, pp. 44-52.

Chai et al., "Hyper-spectral Image Processing Applications on the SIMD Pixel Processor for the Digital Battlefield," IEEE Workshop on Computer Vision Beyond the Visible Spectrum: Methods and Applications, 1999, (CVBVS '99), Jun. 21-22, 1999, pp. 1-9.

Chai et al., "Impact of Power Density Limitation in Gigascale Integration for the SIMD Pixel Processor," Proceedings 20$^{th}$ Anniversary Conference on Advance Research in VLSI, 1999, Mar. 21-24, 1999, pp. 1-15.

First Office Action, Chinese Patent Application No. 200680031521.7, issued Feb. 24, 2010, 2 pages, with English translation.

Hirsch et al., "BiDiScreen: A Thin, Depth-Sensinig LCD for 3D Interaction Using Light Fields," 9 pages, http://web.media.mit.edu/~mhirsch/bidi/bidiscreen.pdf, Dec. 11, 2009.

http://www.technologyreview.com/blog/mimssbits/25623/ Technology Review, Published by MIT, Mims's Bits, Tuesday, Aug. 17, 2010, "The Future of Interfaces is Mobile, Screen-Less and Invisible" printed Sep. 9, 2010, 5 pages.

Japanese Office Action, issued in JP 2008-519641 on Jun. 8, 2010, 6 pages.

Komuro et al., "A Dynamically Reconfigurable SIMD Processor for a Vision Chip," IEEE Journal of Solid-State Circuits, vol. 39, No. 1, Jan. 2004, pp. 265-268.

Koui Ohtake et al., "Four-Story Structured Character Recognition Sensor Image with 3D Integration," Microelectronic Engineering, Elsevier Publishers BV., Amsterdam, NL, vol. 15, No. ¼, Oct. 1, 1991, pp. 179-182, XP000292755; ISSN: 0167-9317, Fig. 2.

Vitabile S. et al., "Multi-Layer Perceptron Mapping on a SIMD Architecture," Neural Networks for Signal Processing, 2002, Proceedings of the 2002 12$^{th}$ IEEE Workshop on Sep. 4-6, 2002, Piscataway, NJ, pp. 667-675, XP010601311; ISBN:0-7803-7616-1 p. 669, paragraph 3, Figs. 1-2.

Wu et al., "Mapping Vision Algorithms on SIMD Architecture Smart Cameras," IEEE, pp. 27-34, 2007.

www.ipms.fraunhofer.de Fraunhofer Institute for Photonic Microsystems (IPMS) "Bidirectional OLED Microdisplay," 2 pages, 2007.

www.ipms.fraunhofer.de Fraunhofer Institute for Photonic Microsystems (IPMS) "Smart Optoelectronic Microsensors by OLED-ON-CMOS," 2 pages, Aug. 27, 2012.

English translation and Chinese language version of Second Office Action, issued by Chinese Paten Office, Chinese Patent Application No. 200680031521.7, dated Mar. 30, 2011, 8 pages.

Chinese Language Version and English Translation of Chinese First Office Action, issued by Chinese Patent Office, Application No. 200680031521.7, dated Feb. 24, 2010, 17 pages.

Japanese Language Version and English Translation of Japanese Office Action, Notification of Reasons for Rejection, Application No. 2008-519641, dated Nov. 30, 2010, 6 pages.

Mexican Official Communication No. 43480, issued by Mexican Institute of Industrial Property (IMPI), dated Jun. 2010, 3 pages.

PCT International Preliminary Report on Patentability and Written Opinion of the International Searching Authority, Application No. PCT/US2006/025731, dated Jan. 9, 2008, 7 pages.

PCT International Search Report and Written Opinion of the International Searching Authority, Application No. PCT/US2006/025731, dated Nov. 15, 2006, 4 pages.

English Language Translation of Russian Office Action, issued by Russian Patent Office, Application No. 2008 102 837, dated Jun. 25, 2010, 10 pages.

Russian Language Office Action, issued by Russian Patent Office, Application No. 2008 102 837, dated Jan. 24, 2011, 1 page.

\* cited by examiner

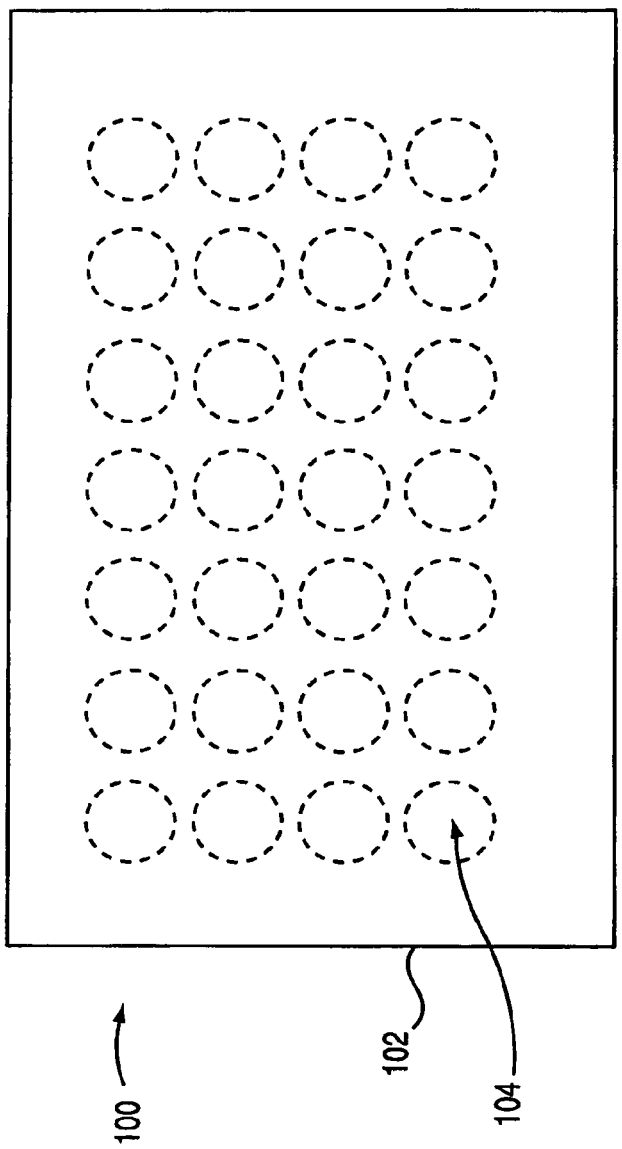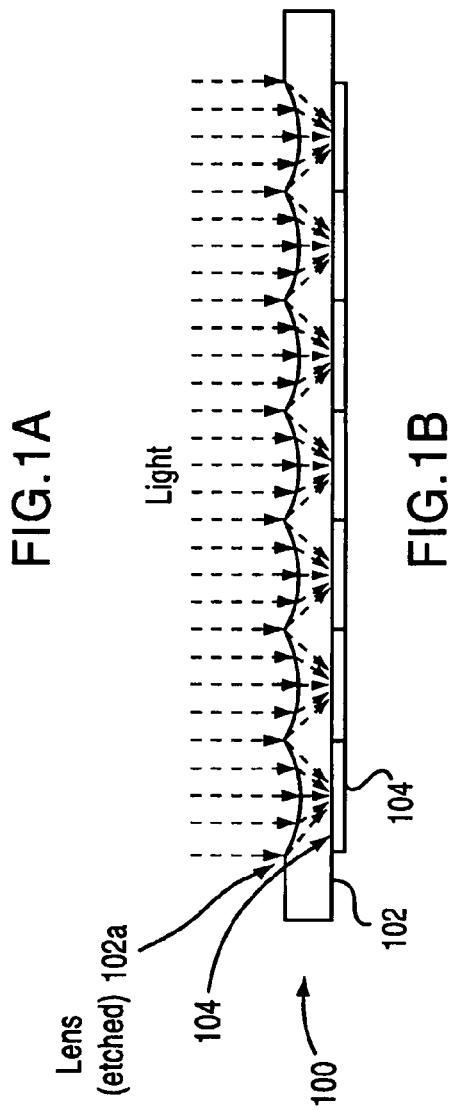

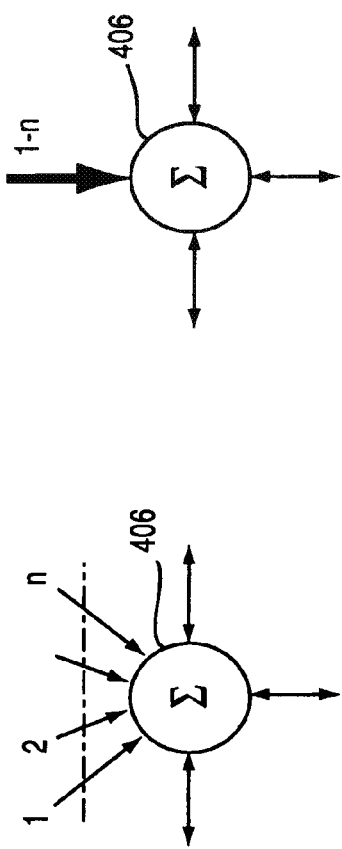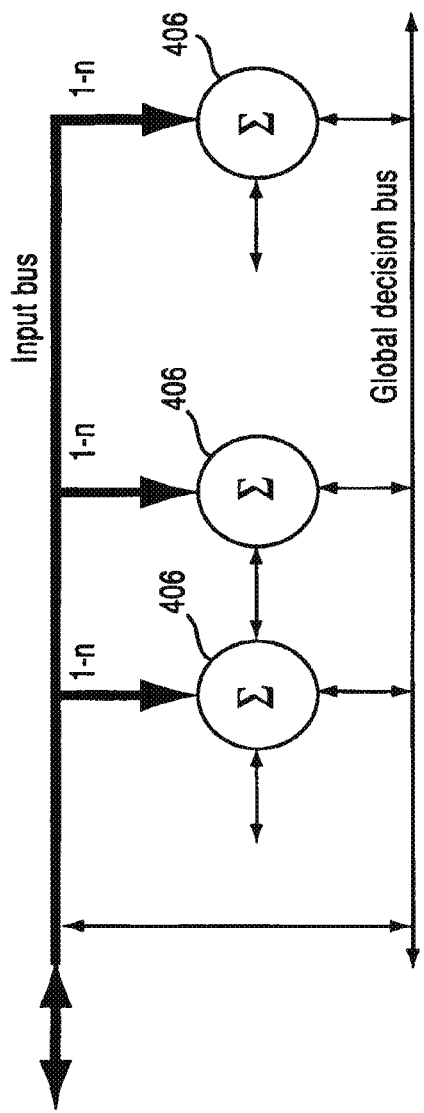

Detect a moving part,
identify and route it

Camera phone with
owner's identification

Door peep hole with visitor
detection and identification

C= CogniSensor (104)
L= Light Element (1301)

C= CogniSensor (104)
L= Light Element (1301)

MONOLITHIC IMAGE PERCEPTION DEVICE AND METHOD

CROSS REFERENCE TO RELATED APPLICATIONS

This application is a continuation-in-part of U.S. patent application Ser. No. 11/477,571, filed Jun. 30, 2006, which claims the benefit of priority to Provisional Patent Application Ser. No. 60/694,988, filed Jun. 30, 2005, the contents of which are incorporated herein by reference in their entirety.

BACKGROUND OF THE INVENTION

1. Field of Invention

The present invention relates generally to imaging devices and methods. In particular, the present invention relates to micro-devices for image recognition embedded in or positioned on a transparent or semi-transparent substrate, such as glass or plastic, with light elements, and methods for image recognition.

2. Description of the Related Art

Transparent surfaces, such as glass, have existed for hundreds of years. Transparent surfaces were initially aimed at protecting a living space while letting the occupants have the perception of the outside world (landscape, weather and possible threat). More recently, transparent surfaces are in huge demand for the display industry, beginning with Cathode Ray Tubes (CRT) and more recently for Liquid Crystal Displays (LCD) and many other kinds of flat panel displays. In use, in most of the cases, a human or living organism (animal, plants) is positioned close to such transparent surfaces.

Image sensors have been available for a few decades (e.g., CCD or CMOS sensors). For example, see U.S. Pat. No. 6,617,565 for a single chip CMOS image sensor, the contents of which are incorporated herein by reference. Typical image sensors are based on camera designs and generally include an integrated circuit located behind a lens, which can be miniature or removable (e.g., screw mounting lens). Sensors are used to transform light energy (photons) into an electrical signal proportional to the amount of light received by the photosensitive elements that are organized into an array on the sensor. An image is synthesized from the output of the photosensitive elements.

Image recognition technology is becoming increasingly in demand. Video cameras of various sizes and makes are in demand for applications such as security, identification, intelligence, quality inspection, traffic surveillance and more. Video cameras are very often linked to display devices by either a wired or a wireless connection. Today, cell phones are routinely outfitted with miniature cameras connected to an LCD display device disposed therein.

Advanced image recognition requires high resolution imaging synthesis. Current image recognition systems operate at relatively slow speeds because of a lack of processing power and/or because processors can only process one pixel of an image at a time.

Thus, there is a need for new imaging recognition devices that are improved over the prior art.

SUMMARY OF THE INVENTION

It is an object of the present invention to provide an image recognition device that has a sensing area (e.g., photosensitive elements) directly included in or on a transparent or semi-transparent material constituting the optical interface between the incident image and the sensing area. The image recognition device itself is preferably transparent or semi-transparent.

It is also another object of the present invention to provide the sensing area with "local" decision capability by means of an array of trainable processing elements. In one embodiment of the present invention, trainable cognitive memory elements or cells are associated with one or more photosensitive elements. Local decision capability provides the advantage that it reduces the transmission requirements (i.e., bandwidth) of the device, especially when the number of photosensitive elements is large and when the transmission frequency of the photosensitive elements must be high. By providing a large array of sensing areas each having local decision capability, a high-resolution, high-speed imaging device is achievable.

According to an embodiment of the present invention, trainable cognitive memory elements can operate in parallel at low frequency and draw very low current. As a result, autonomous operation of each element is ensured and very economical energy sources, such as a solar cell or equivalent, can be used.

According to an embodiment of the present invention, a novel monolithic image recognition device is formed by association of one or more photosensitive elements to one or more trainable cognitive memory elements, all embedded into or positioned on a substrate.

According to an embodiment of the present invention, a plurality of photosensitive elements associated with a plurality of trainable cognitive elements can be arranged in one or multiple arrays and spread over a flat transparent or semi-transparent substrate. The arrays can have variable geometry and connectivity. Typical geometry can be, but is not limited to, a linear array of neurons in parallel, or a 2-dimensional array of neurons connected in a raster or honey-combed geometry.

In one aspect, the present invention provides an image recognition device having a plurality of cognitive sensors, a plurality of optical interfaces and a plurality of light elements. The plurality of cognitive sensors is embedded in or positioned on a transparent or semi-transparent substrate. Each sensor has a photosensitive element and a trainable cognitive memory cell associated with the photosensitive element. Each one of the plurality of optical interfaces embedded in or formed on the substrate is optically coupled to a corresponding one of the plurality of cognitive sensors. The plurality of light elements are positioned on the substrate and configured to emit light.

In some embodiments, the light output by one or more of the plurality of light elements may be controlled in accordance with an output from one or more of the plurality of cognitive sensors. The plurality of light elements may be geometrically arranged to form an image display apparatus. The image display apparatus may be configured to display an image representing light received on the photosensitive elements of one or more of the plurality of cognitive sensors. Each cognitive sensor may be trainable and configured to recognize patterns based on incident light, and the image display apparatus may be configured to display an image and to modify the image in accordance with patterns recognized by one or more of the plurality of cognitive sensors. The plurality of cognitive sensors may have a field of view, and the light elements may be configured to emit light in the field of view. The light elements may be configured to display an image which is visible by objects in the field of view. The light elements may be configured to provide lighting to objects in the field of view and to display an image to the objects in the field of view. One or more of the plurality of cognitive elements may be configured to recognize patterns of incident light and to control the provision of lighting and image display of one or more of the plurality of light elements as a function of the patterns recognized. Each cognitive memory cell may be taught to recognize a different portion of an image, and the plurality of cognitive memory cells may be configured to operate collectively to recognize the image. Each cognitive memory element may have a plurality of neurons coupled on an input side thereof by a multiplexed input bus and on an output side thereof by an output bus, each neuron being taught with a knowledge that allows the corresponding neuron to recognize a signal and perform a decision. The plurality of cognitive sensors may be configured to perform image recognition operations digitally without a software program through a plurality of parallel elements each having self contained, autonomous behavior. Light elements of the plurality of light elements are selected from light emitting diodes (LEDs), organic LEDs and plasma cavities.

In some embodiments, the image recognition device may have photovoltaic devices embedded in or positioned on the substrate. The photovoltaic devices may be configured to receive power supplied wirelessly and to supply the received power to the plurality of cognitive sensors and to the plurality of light elements. The image recognition device may have output transmission lines and power supply lines that are directly engraved or diffused on the substrate. Each of the plurality of cognitive sensors may be configured to receive power from power supply lines and to output communications using the power supply lines. The image recognition device may have a transparent or semi-transparent cover layer, and the plurality of cognitive sensors and the plurality of light elements may be arranged between the cover layer and the substrate. One or more of the plurality of light elements may be configured to emit light through the substrate. One or more of the plurality of light elements may be configured to emit light through the cover layer. The plurality of light elements and plurality of cognitive sensors may be arranged in rows and columns, and the plurality of light elements and plurality of cognitive sensors may alternate in each row and alternate in each column. The plurality of light elements and plurality of cognitive sensors may be arranged so that each of the plurality of cognitive sensors is surrounded by light elements. The plurality of light elements may include, without limitation, red pixels, green pixels and blue pixels.

In another aspect, the present invention provides an image recognition device having a sensing element, processing element coupled to the sensing element, and light emitting element. The sensing element is embedded in or positioned on a transparent or semi-transparent substrate. The processing element is embedded in or positioned on the substrate. The light emitting element is embedded in or positioned on the substrate. The transparent or semi-transparent substrate constitutes an optical interface between an incident image to be sensed and a sensing pixel of the sensing element. The light emitting element is configured to emit light toward the incident image or away from the incident image. In some embodiments, the light emitting element may be one or more light emitting diodes (LEDs), organic LEDs (OLEDs) or plasma cavities. The lighting element may be controlled selectively by an output of the processing element. The processing element may be trainable and configured to recognize patterns based on the sensed incident image. The processing element may be configured to control the light emitted by the light element in accordance with the patterns recognized by the processing element. The sensing element may have a field of view, and the light elements may be configured to emit light in the field of view. The sensing element may have a field of view, and the light elements may be configured to emit light in a direction away from the field of view. The processing element may comprise a plurality of neurons coupled on an input side thereof by a multiplexed input bus and on an output side thereof by an output bus. Each neuron my be taught with a knowledge, and the knowledge may allow the corresponding neuron to recognize a signal and perform a decision. The processing element may be configured to perform image recognition operations digitally without a software program through a plurality of parallel elements each having self contained, autonomous behavior. The image recognition device may further comprise photovoltaic devices embedded in or positioned on said substrate. The image recognition device may further comprise output transmission lines and power supply lines that are directly engraved or diffused on said substrate. The processing element may be configured to receive power from power supply lines and to output communications using the power supply lines. The image recognition device may further comprise a transparent or semi-transparent cover layer, and the sensing element, the processing element and the light element may be arranged between the cover layer and the substrate. The light element may be configured to emit light through the substrate. The light element may be configured to emit light through the cover layer.

In another aspect, the present invention provides an image recognition method. The method provides an optical path to a plurality of sensing elements embedded in or provided on a transparent or semi-transparent substrate by using a plurality of optical interfaces embedded in or provided on the substrate. The method processes, in parallel, signals generated from the plurality of sensing elements in a plurality of processing elements each coupled to one of the sensing elements and each embedded in or provided on the substrate. The method emits light from a plurality of light elements embedded in or provided on the substrate.

In some embodiments, the emitting of light may include controlling the light emitted from the plurality of light elements in accordance with outputs from one or more of the plurality of processing elements. The processing may include recognizing patterns and the emitting may include controlling the light emitted from the plurality of light elements in accordance with the recognized patterns. The recognizing patterns may include detecting the presence of one or more objects within a field of view of the plurality of sensing elements. The recognizing patterns may include determining distance from the substrate of the one or more detected objects. The recognizing patterns may include determining the number of the one or more detected objects. The recognizing patterns may include locating the position of the one or more detected objects. The controlling may include emitting a reduced amount of light from a plurality of light elements when the presence of no objects is detected. The recognizing patterns may include determining whether any of the one or more detected objects is an authorized object. The recognizing patterns may include locating and tracking the gaze of one or more viewers within a field of view of the plurality of sensing elements. The recognizing patterns may include facial recognition or facial expression recognition. The recognizing patterns may include biometric identification. The emitting may include displaying an image. The displayed image may correspond to an image received by the plurality of sensing elements. The processing may include recognizing patterns, and the emitting may further include modifying the displayed image in accordance with the recognized patterns.

In another aspect, the present invention provides an image recognition device having a transparent or semi-transparent substrate, a plurality of cognitive sensors, a plurality of optical interfaces, a filler layer, and a plurality of light elements. The plurality of cognitive sensors is positioned on the substrate, and each sensor includes a photosensitive element and a trainable cognitive memory cell associated with the photosensitive element. The plurality of optical interfaces is formed on the substrate and each are optically coupled to corresponding cognitive sensors. The filler layer has a filler between adjacent cognitive sensors of the plurality of cognitive sensors. The plurality of light elements is positioned on the filler layer and each is configured to emit light. In some embodiments, the plurality of light elements includes red pixels, green pixels and blue pixels.

Further applications and advantages of various embodiments of the present invention are discussed below, with reference to the drawing figures.

In another aspect, the present invention provides an image recognition method. The method provides an optical path to a sensing element embedded in or provided on a transparent or semi-transparent substrate by using an optical interface embedded in or provided on the substrate. The method processes signals generated from the sensing element in a processing element coupled to the sensing element and embedded in or provided on the substrate. The method emits light from a light element embedded in or provided on said substrate.

In some embodiments, the emitting may comprise controlling the light emitted from the light element in accordance with an output from the processing element. The processing may comprise recognizing patterns and the emitting may comprise controlling the light emitted from the plurality of light elements in accordance with the recognized patterns. The recognizing patterns may comprise detecting the presence of one or more objects within a field of view of said sensing element. The recognizing patterns may comprise determining distance from said substrate of the one or more detected objects. The recognizing patterns may comprise determining the number of the one or more detected objects. The recognizing patterns may comprise locating the position of the one or more detected objects. The recognizing patterns may comprise determining whether any of the one or more detected objects is an authorized object. The recognizing patterns may comprise locating and tracking the gaze of one or more viewers within a field of view of the sensing element. The recognizing patterns may comprise facial recognition or facial expression recognition. The recognizing patterns may comprise biometric identification. The emitting may comprise displaying an image. The displayed image corresponds to an image received by the sensing element. The processing comprises recognizing patterns and the emitting further comprises modifying the displayed image in accordance with the recognized patterns.

BRIEF DESCRIPTION OF THE DRAWINGS

FIGS. 1A-1B include respectively, a front and top view of an array of sensors disposed on a glass or plexiglass or other transparent plastic or transparent substrate, having etched lenses therein, according to an embodiment of the present invention;

FIGS. 6A-6C illustrate neural configurations according to embodiments of the present invention;

DETAILED DESCRIPTION OF THE PREFERRED EMBODIMENTS

Figure 2:
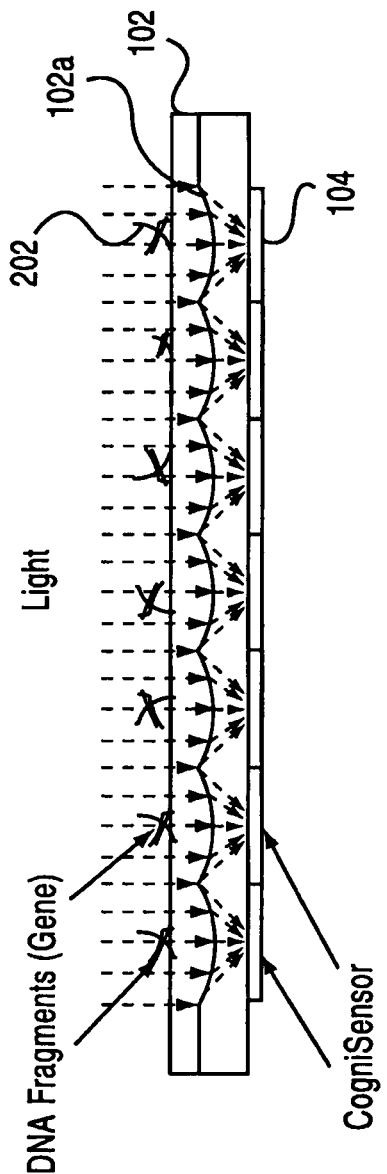
FIG. 2 is a top view of an array of sensors disposed on a glass or plexus substrate, having etched lenses therein, shown detecting DNA fragments, according to an embodiment of the present invention.

While the present invention may be embodied in many different forms, a number of illustrative embodiments are described herein with the understanding that the present disclosure is to be considered as providing examples of the principles of the invention and such examples are not intended to limit the invention to any specific preferred embodiments described and/or illustrated herein.

The present invention is an imaging device that may include a sensor perception device, such as a photosensitive element, connected, bound or otherwise associated with a trainable cognitive element, with both elements deposited chemically or otherwise on or embedded in the surface of a transparent substrate. The association of a sensing area with a trainable cognitive element having "local" decision capability is referenced throughout this document as a "CogniSensor." A trainable cognitive element is referenced throughout this document as a "CogniMem." Sensing areas are generally made up of one or more photosensitive elements, but other sensing arrangements are contemplated.

According to embodiments of the present invention, CogniSensors can be configured to recognize incoming light patterns (e.g., images or portions of images), process the incoming light patterns to make a local decision, and transmit results of or an indication of the local decision. A CogniSensor may include a number of components such as, but not limited to, local decision capability—data input logic, "neurons" and decision output logic, a memory buffer, solar cells for energy autonomy and more. Each CogniSensor preferably features reactive associative learning memories (REALM) arranged in parallel. According to an embodiment of the present invention, CogniMem are capable of pattern recognition without any computer instructions, whether digital or analog.

CogniMem may comprise one or more neurons, which are associative memories accessible in parallel that can react to input patterns similar to their own contents. Neurons can react individually or collectively by reinforcing their response based on the response of other neighboring neurons. This selection can be made through an Inhibitatory/Excitatory input line connected to the neurons.

The contents of the neurons of a CogniMem constitute "knowledge." Knowledge is a set of statically discriminative digital signatures. Knowledge can be static (loaded once) or dynamic (updated by the reaction of other neurons or loaded adaptively from an external knowledge base), but is preferably automatically generated by the learning process without the need of a computer to do so. CogniMem deposited on a same substrate can use identical or different knowledge.

CogniMem can be deposited on or embedded in (or otherwise coupled to) a substrate as part of a CogniSensor or stand-alone. In the former case, the CogniMem is typically dedicated to recognizing pixel data transmitted by a photosensitive element. In the latter case, the CogniMem may be used to support other CogniMem's and may be used, for example, to recognize different data types transmitted by other CogniMem units (for example to consolidate a pattern of responses from multiple CogniSensors).

The following listed patents and published applications, the entire contents of each of which are hereby incorporated by reference, describe various aspects of neuron and neural networks applicable to CogniMems and CogniSensors: U.S. Pat. No. 5,621,863—Neuron Circuit; U.S. Pat. No. 5,717,832—Improved neuron circuit architecture; U.S. Pat. No. 5,701,397—Circuit for pre-charging a free neuron circuit; U.S. Pat. No. 5,710,869—Daisy-Chain circuit for serial connection of neuron circuits; U.S. Pat. No. 5,740,326—Circuit for searching/sorting data in neural networks U.S. Pat. No. 6,332,137—Parallel associative memory for a stand-alone hardware recognition; U.S. Pat. No. 6,606,614—Single wire search and sort; Japanese applications JP8-171543—Daisy-Chain circuit for serial connection of neuron circuits; JP8-171542—Advanced loading circuit; JP8-171541—Aggregation Circuit (Search/Sort); JP8-171540—Neural Network and Neural chip; JP8-069445—Neuron circuit architecture; Korean patent application KR164943—Innovative neuron circuit architecture; European patents EP0694852—Innovative neuron circuit architecture; EP0694854—Improved neural semiconductor chip architecture; EP0694855—Search/Sort for neural networks; EP0694853—Circuit for pre-charging the input vector components in a free neuron circuit during the recognition phase; EP0694856—Daisy-Chain circuit for serial connection of neuron circuits; Canadian application CA2149478—Improved neuron circuit architecture; Canadian patent CA2149479—Improved neural semiconductor chip architecture The number of neurons implemented on a CogniMem can vary from 1 to N, with N theoretically unlimited due to the architecture of the neuron cell. Currently, N can be as high as about 1000. In general, N is determined by the application and in particular, from the diversity of patterns to be recognized and the type of decisions to transmit. One skilled in the art will recognize that the silicon technology may be a significant factor determining the number of neurons that can be provided per unit area.

An exemplary configuration of an image recognition device according to an embodiment of the present invention is illustrated in FIGS. 1A and 1B. FIG. 1A is a top view of the device 100, which includes a substrate 102 that can be made from a number of transparent or semi-transparent materials such as glass, plexiglass, transparent plastics, etc. One or more CogniSensors 104 (in this case, as an array) may be embedded into the substrate 102 or, as in this case, attached or glued to or otherwise coupled to a surface of the substrate 102 (See FIG. 1B). An optical path can be etched or deposited in front of each photosensitive element on the substrate. For example, the substrate 102 can be etched at the location of the CogniSensors 104 in order to create lenses 102a for each CogniSensor 104. Alternatively, a microlens 102a can be inserted into the substrate 102 (FIG. 2) or glued (FIGS. 3A-B) onto the substrate 102 in front of the photosensitive elements. Another option may be to alter the substrate to vary the reflective index of the portion of the substrate proximate each sensor, to focus incident light. As shown in FIG. 1B, incident light is focused on each CogniSensor 104 by the substrate lenses 102a.

The plurality of lenses 102a allows the CogniSensors 104 to cover a variety of fields of view, preferably equal to the substrate surface but may also possibly cover views narrower or larger than the field of view equal to the substrate surface. The microlenses 102a turn the array of CogniSensors 104 into a telecentric image perception device with an unlimited surface and view.

Figure 3:
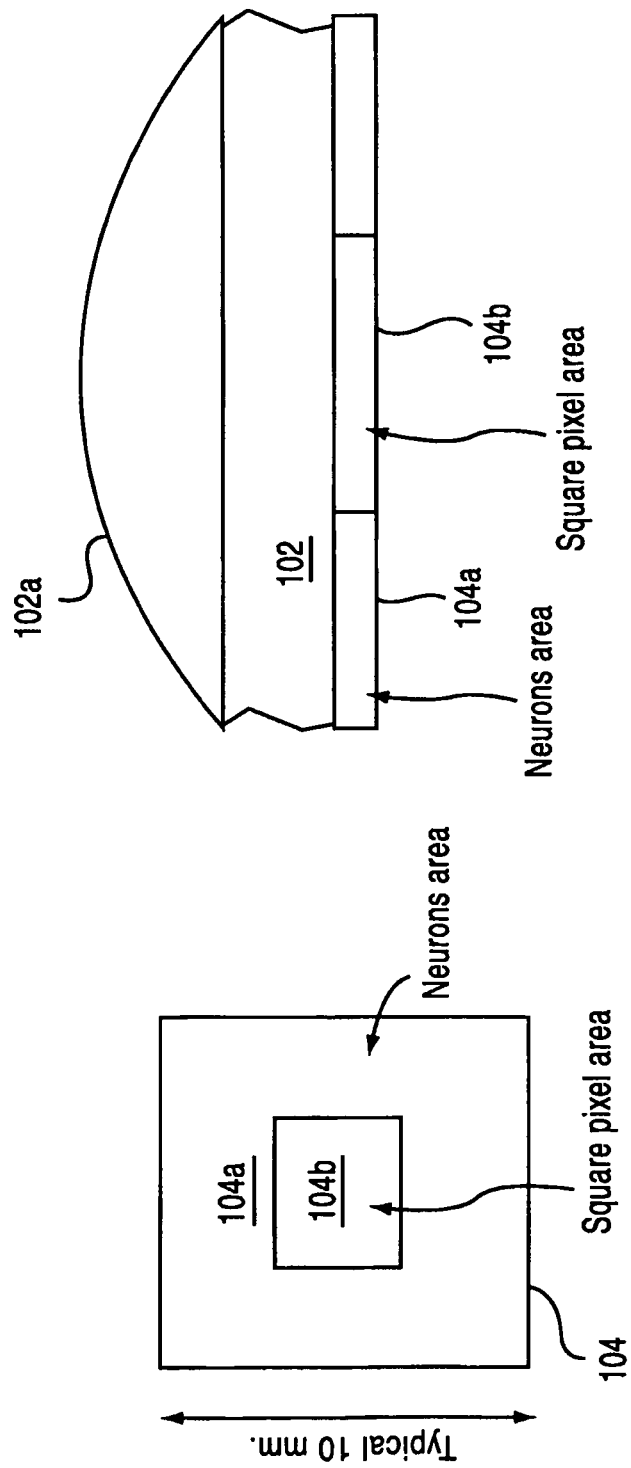
FIGS. 3A-3B illustrate respectively a side and top view of a die of sensors according to one embodiment of the present invention.

FIG. 2 is a top view of a monolithic imaging device according to another embodiment of the present invention. As shown, lenses 102a are embedded into substrate 102 and positioned over each CogniSensor 104. As an example of a use of the imaging device, DNA fragments 202 are shown being positioned on the surface of the substrate 102. Each CogniSensor 104 could be configured to recognize individually, or in collaboration with adjacent CogniSensors 104, a particular DNA fragment and output a signal when that fragment is identified.

FIGS. 3A-B illustrate an exemplary embodiment of an individual CogniSensor 104. As shown in FIG. 3A, an area of concentrated neurons 104a surrounds a pixel sensing region 104b. The neurons in neuron area 104a can be coupled to sensing elements in pixel area 104b and can be configured to recognize patterns sensed by the pixel area 104b. As shown in FIG. 3B, a convex lens or micro-lens 102a is positioned over the pixel area 104b on the surface of a substrate 102 for focusing incident light onto the pixel area 104b or connected directly to the sensor without an intermediate substrate. Lens 102a could, for example, be chemically deposited onto the substrate by conventional means.

Figure 4:
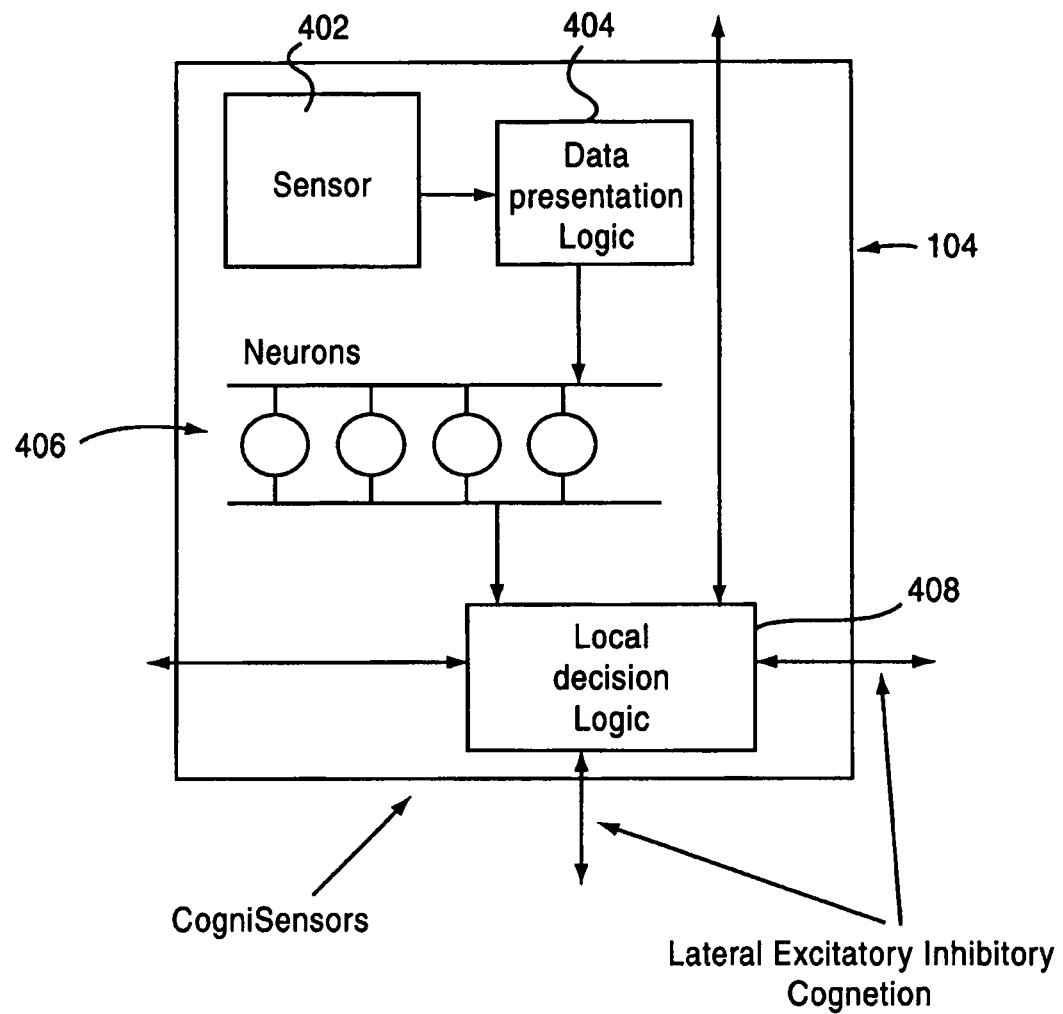
FIG. 4 is a block diagram of a sensors according to an embodiment of the present invention.

FIG. 4 is a functional block diagram of an exemplary CogniSensor 104 according to an embodiment of the present invention. CogniSensor 104 includes a sensor or sensing region 402, data presentation logic 404, a neural network 406, and local decision logic 408. The sensor 402 may include one or more sensing elements, such as photosensitive elements. The data presentation logic 404 is coupled to the sensing region 402 and the neural network 406 and is configured to present the data output from the sensors to the neurons in a manner suitable for processing. The neurons 406 are or become "taught" with knowledge and can process data input to neurons 406 from the presentation logic 404, and output processed data to the local decision logic 408, which makes a decision based on the processed data. Local decision logic 408 may be coupled to other CogniSensors or CogniMem by various known methods. Accordingly, CogniSensors 104 may be arranged in arrays and arrays of arrays.

Figure 5B:
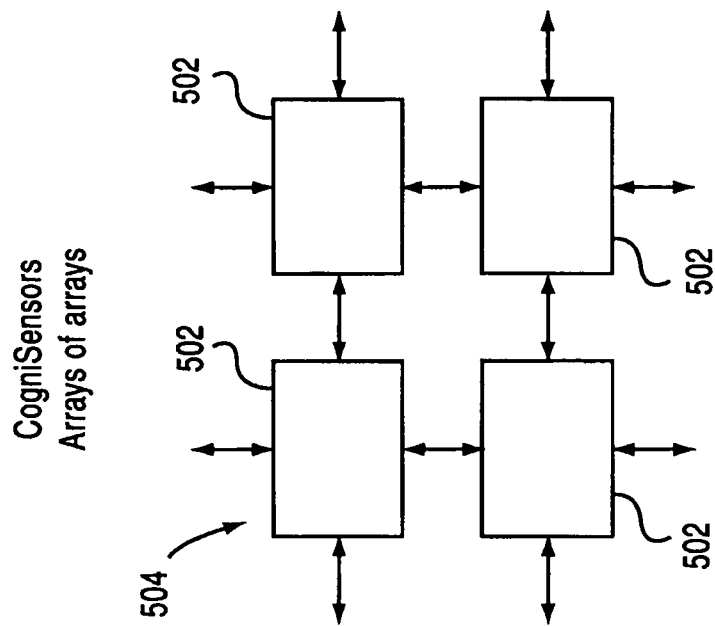
FIG. 5B is a block diagram of a sensors bank of arrays, according to an embodiment of the present invention.
Figure 5A:
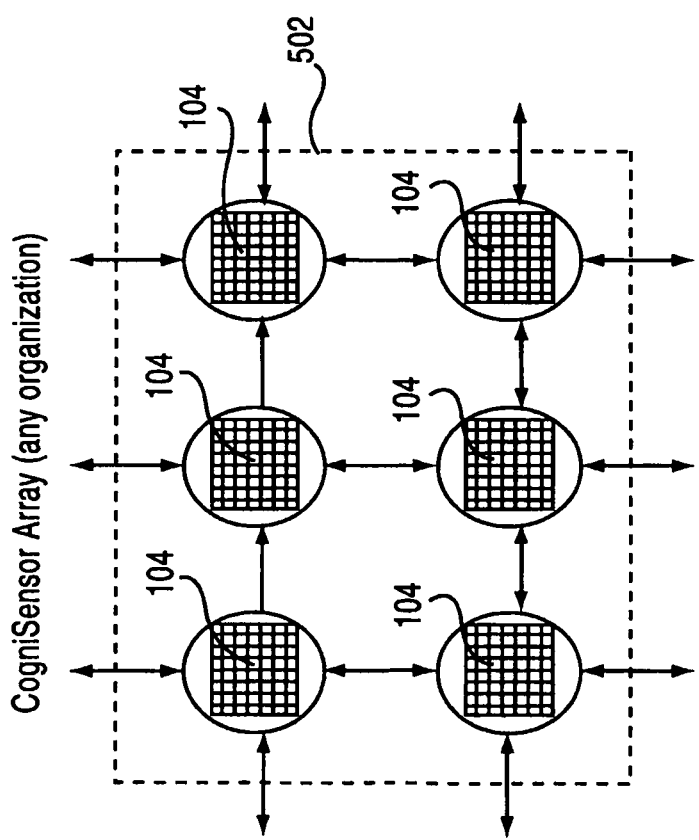
FIG. 5A is a block diagram of a sensors arrays according to an embodiment of the present invention.

FIGS. 5A and 5B show arrangements of arrays of CogniSensors. As shown in FIG. 5A, each CogniSensor 104 can be coupled to a plurality of CogniSensors 104 to for an array 502. As described below, input and output buses may be utilized for coupling of sensors in series or parallel.

As shown in FIG. 5B, each array 502 may be coupled to a plurality of arrays 502 to form a bank of arrays 504. By arranging arrays of arrays of CogniSensors 104, an extremely powerful recognition device is produced, that is both high-resolution and high-speed. That is, the resolution of the imaging device can be increased by increasing the number of sensors. However, by providing robust local decision capability in the form of CogniMem, the increase in the number of CogniSensors does not decrease processing speed of the device. Further, one will understand that the arrays can be organized in many different geometries and the invention is not limited to square arrays.

As mentioned above, each neuron can be coupled to a plurality of inputs 1-n, which can be, for example, multiplexed inputs, but is not limited thereto. FIG. 6A is a representation of a neuron having multiple inputs, which is simplified in FIG. 6B. As a result, an array of neurons can be assembled using an input bus 602 (there is no bus 602 on FIG. 6C), as shown in the simple parallel architecture in FIG. 6C. Each output of the neurons 406 can be connected to a global decision bus 406.

Figure 7:
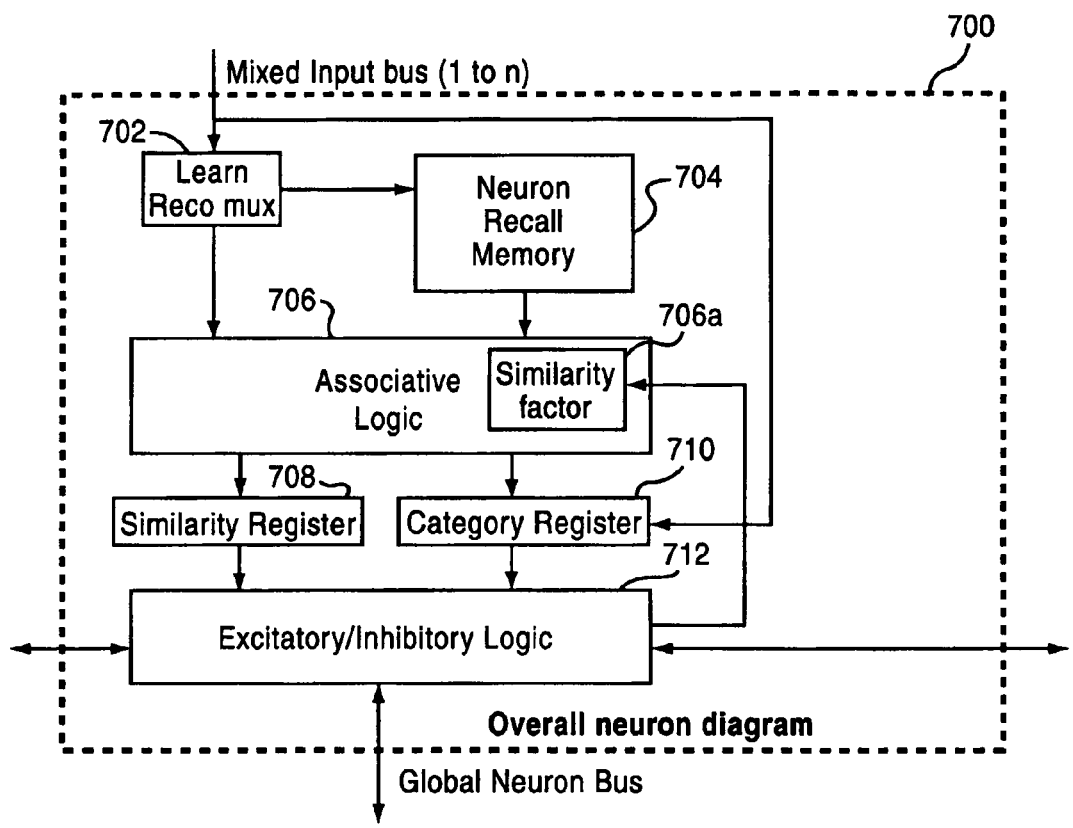
FIG. 7 is a block diagram of a neuron according to an embodiment of the present invention.

FIG. 7 is a functional block diagram of an exemplary neuron according to an embodiment of the present invention. The purpose of the neurons organized as an unlimited expansion network is to learn and recall digital vectors or signature (the pattern). Digital signatures are mostly spatial distributions of light intensity coded by a data reduction process. Neurons may be connected in parallel as represented in FIG. 6C, which means that all the neuron inputs are connected in parallel as well as all their outputs.

Data signals may be input from a multiplexed input bus (not shown) into the neuron 700. A learn multiplexer 702 can divide the multiplexed input signals and transmit input data signals into a neuron recall memory 704 and an associative logic element 706. The neuron recall memory 704 processes the input signals and outputs processed signals to the associative logic element 706. The associative logic element 706 includes a similarity factor deciding element 706a.

Every neuron can receive a broadcasted pattern (i.e., vector representing a digital signature of the sensor data) generated by the data presentation logic 404. This broadcasted pattern can be a transform (data reduction) of sensor generated data either instantaneous, or in the time domain.

A neuron has three possible subsequent chronological states: dormant, ready to learn (RTL) and thereafter committed. At least one neuron is in the RTL state at all times except if the network is full (i.e., all the neurons being committed). If one considers all the parallel connected neurons as a chain, the RTL neuron can move from the first position of the chain to the last position. In context of this representation, the RTL neuron will be typically on the right side of the committed neuron and the dormant neuron will be on the right side of the RTL neuron.

When a neuron is dormant, it will not react to any incoming pattern. A RTL neuron will load the incoming pattern into its recall memory in order to learn it if the user process decides so. This RTL neuron will have no participation in the recognition process but will be dedicated to build new knowledge while learning.

The learning process includes creating new knowledge when an unknown pattern occurs and the user decides to learn it. This knowledge addition will take place in the RTL neuron. In addition to creating a new knowledge, the committed neurons, which possibly wrongly identify an incoming pattern (i.e., fails to associate the proper category) will reduce their similarity domain to avoid further misclassification. This causes knowledge modification or "adaptive learning."

Photo elements can output a digitized radiometric value. The combination of all the values across a spatial distribution forms a pattern; such pattern can also evolve in the time domain and generate a stream of pattern. This pattern goes through a data reduction process which leads to the digital signature (vector) of the radiometric pattern. The reduction process must not exceed what is called the "minimum discrimination matrix" described below. For example with a 5×7 matrix, it is possible to discriminate all the European uppercase characters but not a Chinese Kanji character, for which a 16×16 matrix is needed.

A committed neuron learns a pattern when it is in the RTL state, by associating the vector loaded into the recall memory 704 with a category held into the category register 709. When the incoming pattern enters a committed neuron the learn/reco mux 702 will let transmit it to the associative logic 706 in order for this pattern to have its similarity evaluated toward the vector held into the recall memory 704. If the calculated similarity is found to be less or equal the similarity factor 706a, the neuron will be excited and therefore signal thru the logic 712. The function of the excitatory/inhibitory logic is to perform a global arbitration as many neurons become excited, among all the committed "firing" (i.e., excited) neurons and to "inhibit" those neurons which do no have the best similarity.

Region of Interest

Each CogniSensor may be associated with a region of interest (ROI) for a video frame. Each CogniSensor can extract a signature of the ROI to broadcast to its neurons (for learning or recognition purposes). The signature of the ROI is a compressed format of its pixel values reduced to fit into a sequence of N values with N being the size of the neuron's memory cells.

Take the example where a neuron is outfitted with a memory capacity of 256-bytes. A CogniSensor may classify a rectangular ROI of N×M pixels. The ROI signature will be reduced from N×M values to 256 values by, for example, simple block compression.

CogniSensors can be configured to process ROIs of any shape, and a choice of signature extractions can be application specific (e.g., part inspection, surface inspection, face recognition, target tracking, etc). Some signature extractions can integrate time, repetitivity, etc. Also, neurons can be outfitted with memory cells larger than 8-bit to accommodate inputs from sensors with 12-bit pixel resolution or more.

The combination of the neurons together with the sensor and the data presentation logic constitutes a totally novel approach for embedded image recognition without any software needed for either the learning or the recognition process.

The addressing of the CogniMem can be pass-through or selective (such as driven by the response of other CogniMem units).

It should be understood that a substrate hosting CogniSensor(s) serves as both a mechanical support and as a lens (See, e.g., FIGS. 1-2). The substrate can be, but is not limited to, a rigid or flexible, flat or curved, surface made of a glass, Plexiglass, plastic, Mylar or other material.

The connectivity between CogniSensors and CogniMem units on a same substrate should preferably use a minimum number of wires.

The knowledge loaded in the CogniSensors can preferably address the recognition of different families of patterns, whether related or not.

Examples

Figure 8:
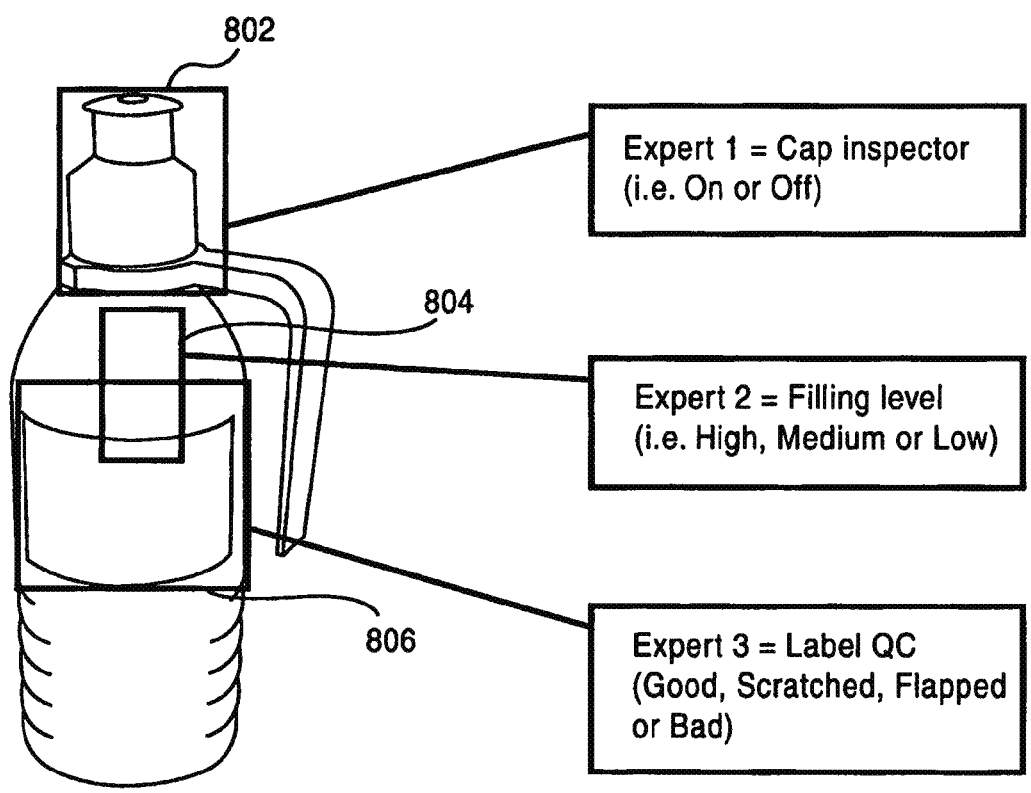
FIGS. 8-12 illustrate exemplary applications of the image recognition device according to embodiments of the present invention.

According to an embodiment of the present invention, CogniSensors are ideal for performing inspection during an automated manufacturing process. As shown in FIG. 8, one or more CogniSensors could be used to inspect a water bottle. In this example, three different CogniSensors are used to inspect three different regions referenced as Expert 1-3. The global response can depend on the combined responses of the three "expert" CogniSensors.

In this example, CogniSensor 1 (Expert 1) can be trained to classify signatures of the ROI containing the cap of the bottle 802. CogniSensor 1 can classify its ROI into 2 categories: Good and Bad. The Bad category can combine several cases: the cap is missing or the cap is not screwed on properly.

Similarly, CogniSensor 2 (Expert 2) can learn signatures of the ROI crossing the line of fluid in the bottle 804. The ROI can be a narrow vertical rectangle and would ideally cover the minimum and maximum possible filling levels in the bottle. Depending on the quality control criteria of the manufacturer, CogniSensor 2 can classify its ROI into any number of categories, for example: Acceptable and Not Acceptable; Too High, Acceptable and Too Low; or Too High, High but Acceptable, In Range, Low but Acceptable, Too Low.

CogniSensor 3 (Expert 3) can learn signatures of the region of interest covering the label area 806. CogniSensor 3 can be trained to recognize a diversity of cases or combination of cases such as for example: Missing label, Defective label (torn, scratched or folded), misplaced labels (up side down, slanted) and Good.

An output from CogniSensors 1-3 could be provided to controller associated with the automated manufacturing process to take appropriate action based on the decisions made thereby.

Figure 9A:
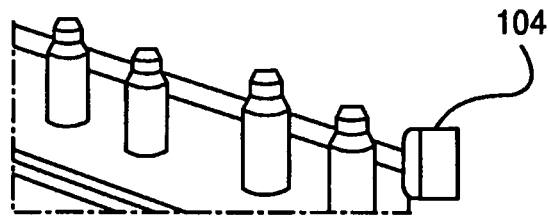
Figure 9B:
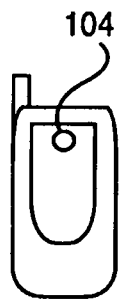
Figure 9C:
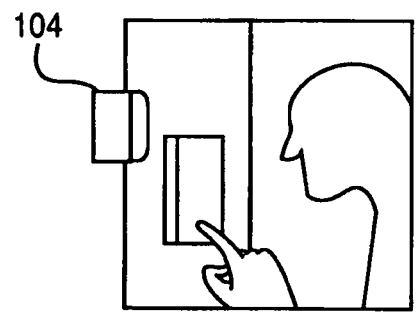

According to an embodiment of the present invention, CogniSensors can be individually packaged to form a smart photocell or smart microlens. Such a device has application to a large number of technologies and could be used, for example, to detect moving parts, identify routes or route moving parts in a mechanized assembly process (FIG. 9A); for biometric identification, such as in a camera phone (FIG. 9B); or for visitor detection and identification in a door peep hole or the like (FIG. 9C).

Figure 10:
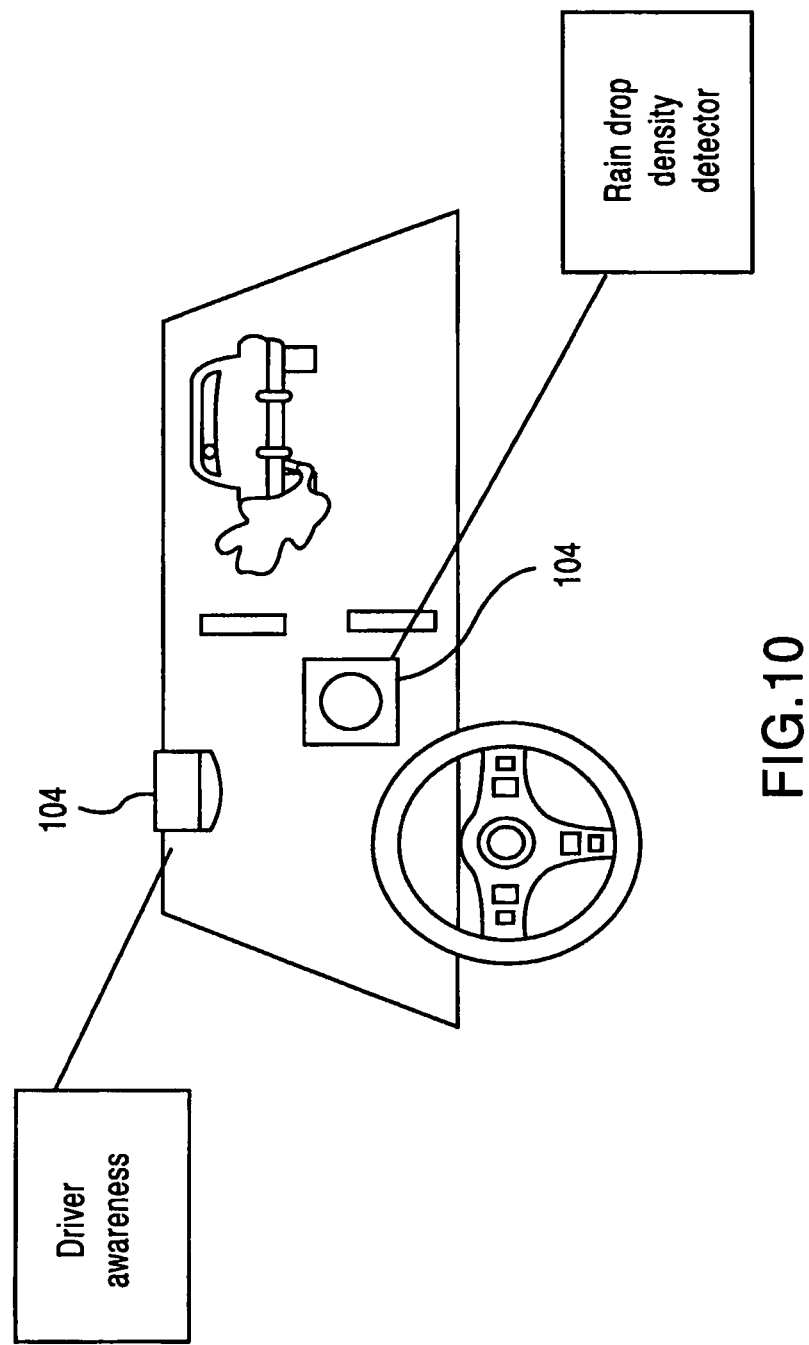

According to another embodiment of the present invention, a driver awareness detection system is provided. Referring to FIG. 10, one or more CogniSensors 104 may be embedded in a windshield, dashboard flat panel display, or headlight of a motor vehicle. CogniSensors 104 can be taught to recognize patterns that indicate when a driver is no longer attentive (e.g., the driver is falling asleep) and output a signal to trigger an alarm. Such patterns could include gaze tracking, face recognition, facial expression recognition and more. Further, CogniSensors 104 in a windshield or headlight could be taught to recognize objects or events external to the vehicle, such as for identifying rain drops with a windshield wiper system or road hazards for a road hazard warning system.

The detection of an object which can appear randomly in the far or near field of view can be made a number of ways. For example, two or three sensors can be outfitted with lenses focusing at different distances. The sensors can be loaded with the same knowledge, but work on regions of interest with different sizes. The global response of the recognition system can be considered positive if at least one sensor recognizes the object.

Also, CogniSensors can be designed with input sensors sensitive to different wavelengths such as Near-IR, IR, color filtered, etc. For a given object or scene, such CogniSensors will produce different pixel values but can be trained on their respective video image to recognize the categories of objects. In target tracking, the combination of near-IR and IR CogniSensors will give the ability to recognize a target at any time of the day.

Figure 11A:
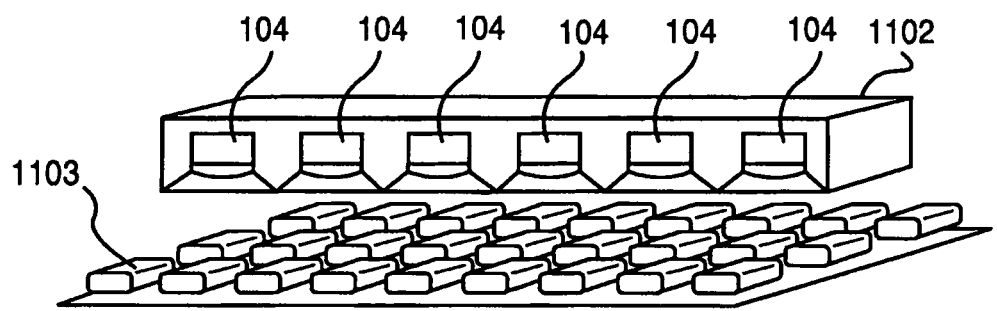
Figure 11B:
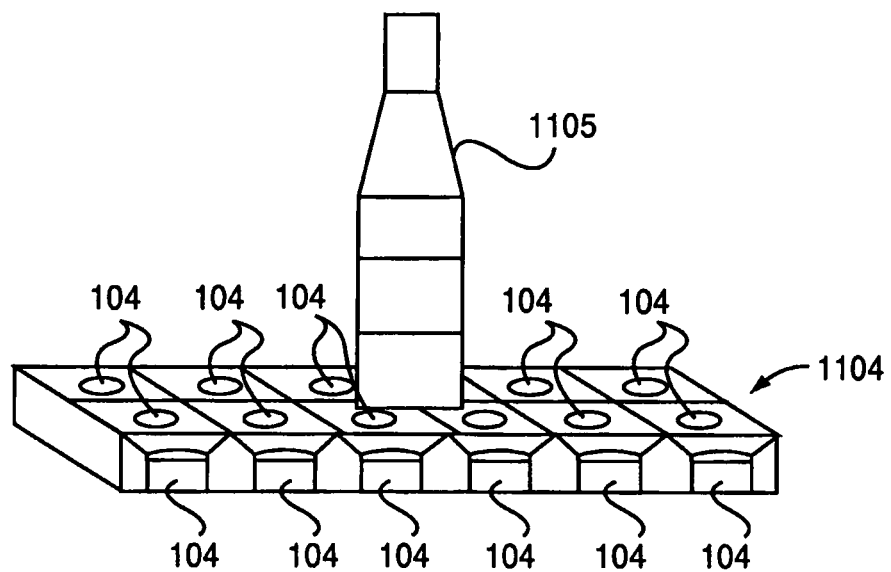

According to another embodiment of the present invention, arrays of CogniSensors can be used in many other manufacturing applications. For example, as shown in FIG. 11A, a 1-dimensional array of CogniSensors 1102 can be used to for inspection of glass floats 1103 in a manufacturing process. As shown in FIG. 11B, a 2-dimensional array of CogniSensors 1104 can be used for detection of contaminants at the bottom of containers 1105, such as beverage bottles. In such applications, each CogniSensor can be taught to identify patterns that indicate flaws in glass or contaminants in a fluid.

Figure 12:
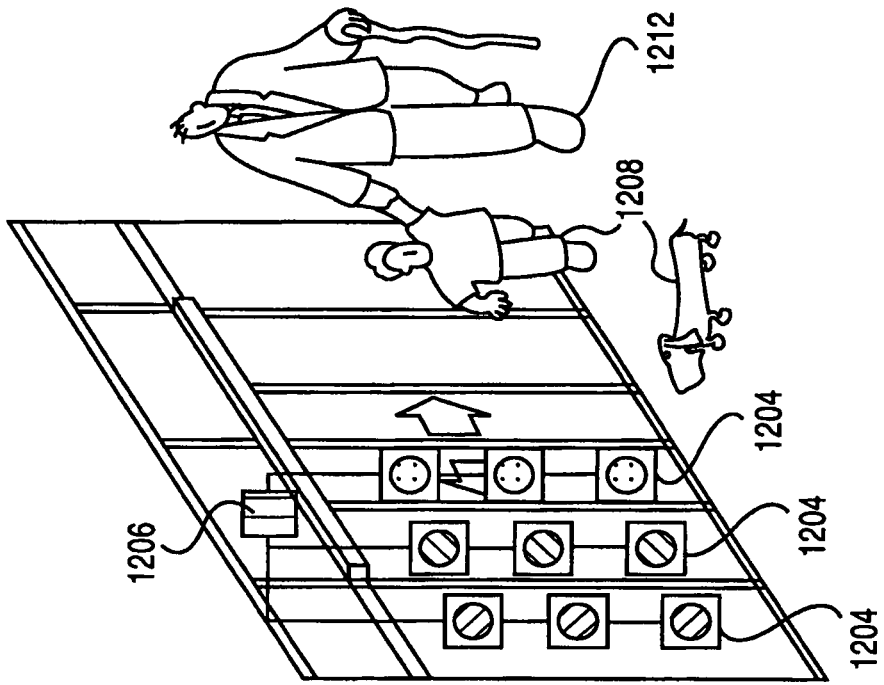

According to another embodiment of the present invention, CogniSensors can be distributed across a glass plane or the like, to perform multiple independent functions. CogniSensors can be grouped and taught with different knowledge per group. FIG. 12 shows as one example, a sliding glass door 1202 that includes several groups of CogniSensors 1204 for detecting approaching objects of different size. A first group could be taught with knowledge for recognizing a first size 1208 of human or animal (e.g., dog), while a second group can be taught for a different size person (e.g., boy) 1210, a third group for another size person (e.g., adult) 1212, and so forth. Each group 1204 could be coupled to one or more CogniMems 1206 for control of the sliding door.

According to another embodiment of the present invention, as shown in FIGS. 13A-13D, one or more light elements 1301 may be embedded in or positioned on the same substrate 102 in or on which one or more CogniSensors 104 are embedded or positioned. Each CogniSensor 104 has a field of view from which light incident on the Cognisensor 104 is received. A light element 1301 may be configured to emit light at least into the field of view of one or more CogniSensors 104 (e.g., configured to emit light through substrate 102). Alternatively, a light element 1301 may be configured to emit light at least outside a field of view of one or more CogniSensors 104 (e.g., configured to emit light away from substrate 102). In some embodiments, one or more light elements 1301 may be configured to emit light to one side of substrate 102, and one or more other light elements 1301 may be configured to emit light to the other side of substrate 102.

The one or more light elements 1301 may be, without limitation, light emitting diodes (LEDs), organic LEDs (OLEDs), plasma cavities or any other suitable electronic or chemical luminescent source. The one or more light elements 1301 may be driven to emit light having a predetermined intensity and/or color. The intensity and/or color of one or more light elements 1301 may be different than the intensity and/or color of light emitted by one or more other light elements 1301. In addition, one or more light elements 1301 may be configured so that the intensity and/or color of emitted light are adjustable or controllable. As few as one CogniSensor 104 and one light element 1301 may be embedded in or positioned on substrate 102. However, a plurality of CogniSensors 104 and/or a plurality of light elements 1301 may be embedded in or positioned on substrate 102. When a plurality of CogniSensors 104 and/or light elements 1301 are used, light elements 1301 and Cognisensors 104 may form an array on substrate 102, and the number of light elements 1301 may or may not correspond to the number of Cognisensors 104. For example, there might be a certain number of light elements 1301 for every one Cognisensor 104. The one or more light elements 1301 may be configured to provide lighting and/or display images.

As described above and shown in FIGS. 3A and 3B, each of the one or more CogniSensors 104 may include a pixel area 104b and a neuron area 104a. Pixel area 104b may receive light incident on pixel area 104b from a field of view of the CogniSensor 104, and neurons in the neuron area 104a may be configured to detect and recognize patterns of the light received by pixel area 104b. Each of the one or more light elements 1301 may be connected to and controlled in accordance with the output(s) of one or more CogniSensors 104. Accordingly, each of the one or more light elements 1301 may be controlled in accordance with the patterns recognized by one or more CogniSensors 104. For example, one or more Cognisensors 104 may control light elements 1301 to provide intelligent lighting and/or intelligent display.

Figure 13A:
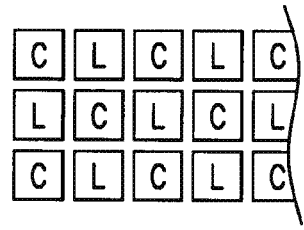
FIGS. 13A-13D illustrate embodiments in which sensors and light elements are disposed in or on the same transparent or semi-transparent substrate.

An array of CogniSensors 104 and light elements 1301 that may be embedded in or positioned on substrate 102 is shown in FIG. 13A. In this embodiment, CogniSensors 104 and light elements 1301 are arrayed in rows and columns of alternating CogniSensors 104 and light elements 1301. Further, because CogniSensors 104 and light elements 1301 alternate in both rows and columns, one or more of Congisensors 104 are adjacent to a light element 1301 on each of the four sides of the CogniSensor 104. Similarly, one or more of the light elements 1301 are adjacent to a CogniSensor 104 on each of the four sides of the light element 1301. In alternative embodiments, CogniSensors 104 and light elements 1301 may be arrayed in alternating columns or rows of CogniSensors 104 and light elements 1301. In these embodiments, there may be a one to one ratio of light elements 1301 to CogniSensors 104. Further, each CogniSensor 104 may control the intensity and/or color of an adjacent light element 1301 and/or non-adjacent light elements 1301.

Figure 13B:
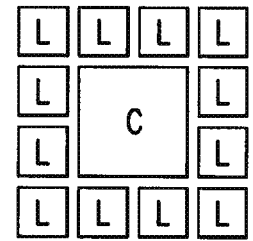

An array of CogniSensors 104 and light elements 1301 that may be embedded in or positioned on substrate 102 according to another embodiment is shown in FIG. 13B. In this embodiment, one or more CogniSensors 104 may be embedded in or positioned on a substrate 102, and each CogniSensor 104 is surrounded by a plurality of light elements 1301. For example, and as shown in FIG. 13B, each CogniSensor 104 may be surrounded by twelve light elements 1301. However, other ratios are possible. For instance, each CogniSensor 104 may be surrounded by eight light elements 1301. Although light elements 1301 may form a single ring around each CogniSensor 104, one or more additional rings of light elements 1301 may also be formed around each CogniSensor 104. Each CogniSensor 104 may control the intensity and/or color of the light elements 1301 that surround the CogniSensor 104 and/or light elements that surround other CogniSensors 104.

Figure 13C:
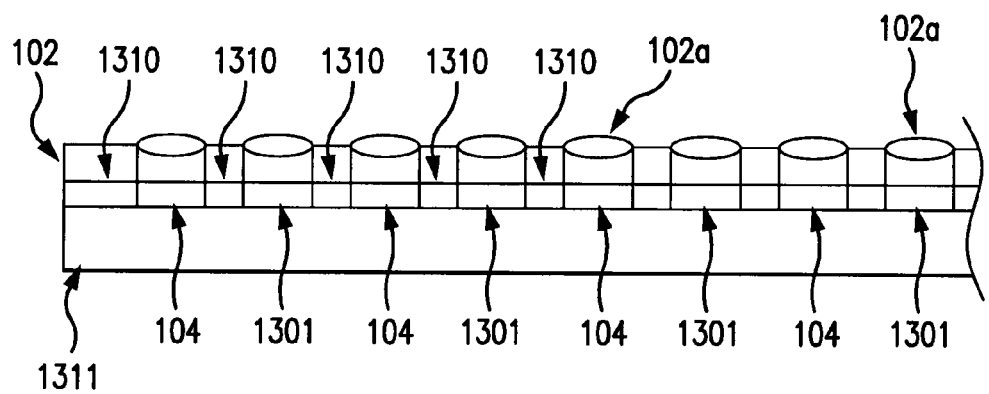

FIG. 13C shows a cross-section of CogniSensors 104 and light elements 1301 embedded in or positioned on a transparent or semi-transparent substrate 102. In this embodiment, light elements 1301 emit light to the side of substrate 102 from which light incident on CogniSensors 104 is received. Accordingly, light elements 1301 may be configured to emit light through substrate 102 into the field of view of one or more CogniSensors 104. As illustrated, lenses 102a are embedded in or positioned on substrate 102, and each lens 102a provides an optical path to either a CogniSensor 104 or a light element 1301. Lenses 102a may be formed in any of the manners discussed above in regard to FIGS. 1B, 2 and 3B. Further, as shown in FIG. 13C, CogniSensors 104 and light elements 1301 may alternate and the filler of filler layer 1310 may be located between the alternating CogniSensors 104 and light elements 1301. Filler layer 1310 may include conductors directly engraved or diffused on substrate 102 configured to supply power and/or carry signals to and/or from Cognisensors 104 and to and/or from light elements 1301. The one or more CogniSensors 104 and/or one or more light elements 1301 may be interconnected together by a transparent or opaque wiring. Also, a cover layer 1311 may be located on the side of CogniSensors 104 and light elements 1301 opposite the substrate 102. Like substrate 102, cover layer 1311 may be transparent or semi-transparent and may be made from glass, plexiglass or transparent plastics.

Figure 13D:
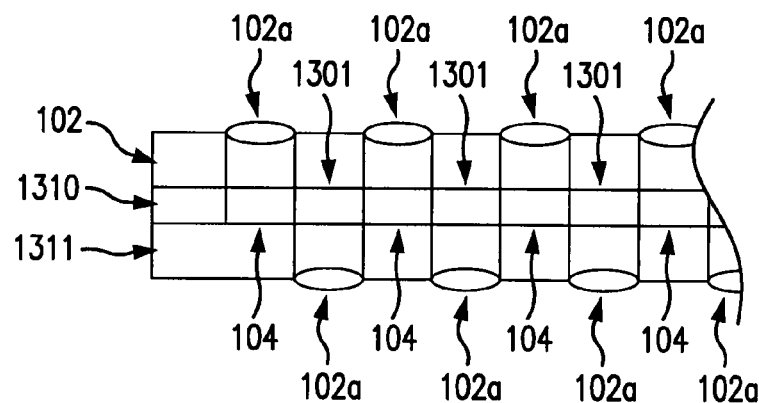

FIG. 13D shows a cross-section of CogniSensors 104 and light elements 1301 embedded in or positioned on transparent or semi-transparent substrate 102 according to an embodiment in which light elements 1301 emit light to a side of substrate 102 opposite the side of substrate 102 from which light incident on CogniSensors 104 is received. Accordingly, light elements 1301 may, for example, emit light through cover layer 1311 instead of through substrate 102. As shown in FIG. 13D, lenses 102a may be embedded in or positioned on substrate 102 and cover layer 1311. Each lens 102a embedded in or positioned on substrate 102 provides an optical path to a CogniSensor 104, and each lens 102a embedded in or positioned on cover layer 1311 provides an optical path to a light element 1301. A lens 102a may be embedded in or positioned on cover layer 1311 in any of the manners discussed above in which lenses 102a are embedded in or positioned on substrate 102.

All of the light elements 1301 shown in FIG. 13C are configured to emit light through substrate 102, and all of the light elements 1301 shown in FIG. 13D are configured to emit light through cover layer 1311. However, in some embodiments, one or more light elements 1301 may be configured to emit light through substrate 102 while other light elements are configured to emit light through cover layer 1311.

In operation, the outputs of one or more CogniSensors 104 may be used to control one or more light elements 1301. As described above, the one or more CogniSensors 104 may be used to detect and recognize patterns of light incident on pixel areas 104b of CogniSensors 104. Thus, one or more CogniSensors 104 may be trained to detect the presence of one or more objects within the CogniSensors' field of view, to count the number of objects with the field of view, to determine the distance between one or more detected objects and substrate 102 or CogniSensor 104 (e.g., via stereoscopy), to locate the position of one or more detected objects, to determine whether one or more of the detected objects are authorized objects, to recognize faces within the field of view, to recognize facial expressions on the recognized faces, to locate and track the gaze of one or more viewers within the field of view, and/or to perform biometric identification. In addition, one or more CogniSensors 104 may control one or more light elements 1301 when detecting an unknown object. Although not listed exhaustively herein, other forms of pattern recognition known to those skilled in the art are also possible.

The patterns recognized by one or more CogniSensors 104 may then be used to selectively and individually control each of the one or more light elements 1301. Examples of selective controlling of one or more light elements 1301 may include turning one or more light elements 1301 on or off, adjusting the intensity of light emitted by one or more light elements 1301, and/or adjusting or changing the color of light emitted by one or more light elements 1301.

In addition, because the CogniSensors 104 may be spread out on or in the substrate 102, the CogniSensors 104 may have a large sensing area without the necessity of a wide angle lens. Accordingly, CogniSensors 104 may detect and recognize objects even when the objects are very close to the substrate 102.

Figure 14A:
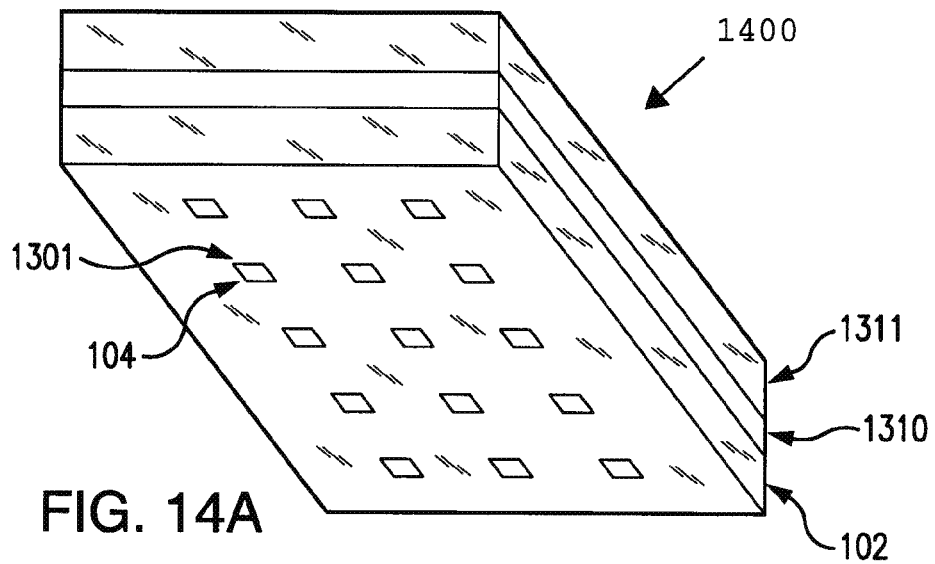
FIGS. 14A-14C illustrate an embodiment of an intelligent lighting unit having sensors and light elements disposed in or on the same transparent or semi-transparent substrate.
Figure 14B:
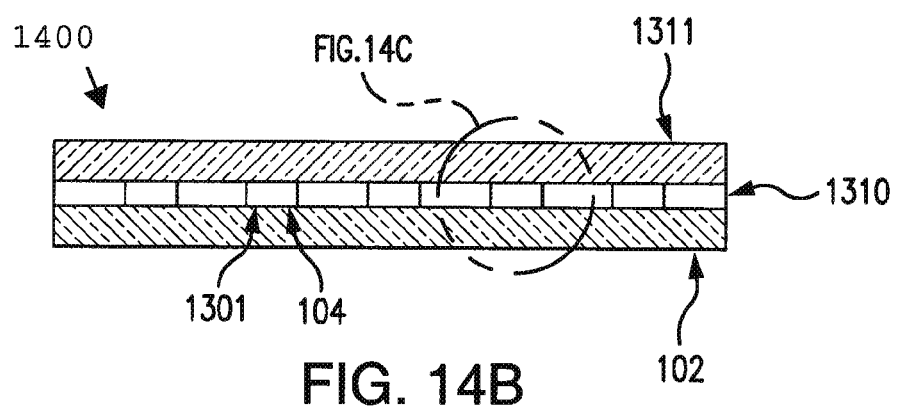
Figure 14C:
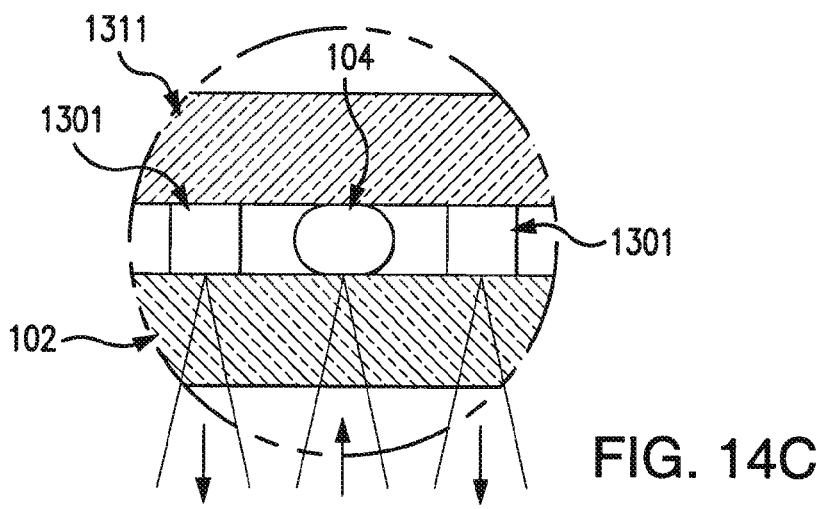

FIGS. 14A-14C illustrate an example configuration of light elements 1301 and CogniSensors 104 in an intelligent lighting unit 1400. Like the embodiments shown in FIGS. 1-7, intelligent lighting unit 1400 has a transparent or semi-transparent substrate 102, and one or more CogniSensors 104 are embedded in or positioned on substrate 102. In addition, one or more light elements 1301 may be embedded in or positioned on substrate 102. In some embodiments, a cover layer 1311 may be provided behind the one or more CogniSensors 104 and one or more light elements 1301, and a filler layer 1310 may be provided between substrate 102 and cover layer 1311. By having one or more CogniSensors 104 and one or more light elements 1301 in or on the same substrate 102, the intelligent lighting unit may be thin and compact.

As shown in FIG. 14A, CogniSensors 104 and light elements 1301 may form an array on or in substrate 102. Although a specific example in which groups of CogniSensors 104 and light elements 1301 are arrayed in or on substrate 102 is shown in FIG. 14A, many other arrangements are possible. For example, CogniSensors 104 and light elements 1301 may be uniformly distributed over substrate 102, may be clustered together, may be located peripherally, and/or may be located centrally.

FIG. 14B shows a cross-section of intelligent lighting unit 1400, and FIG. 14C shows an exploded image of a portion of the cross-section shown in FIG. 14B having a CogniSensor 104 and light elements 1301. Although a specific example configuration is shown in which light elements 1301 are located on either side of CogniSensor 104, other configurations are possible. For instance, CogniSensor 104 may be surrounded on all sides by light elements 1301 forming a square, rectangle, circle and/or oval around CogniSensor 104, and/or the Cognisensors 104 and light elements 1301 may alternate. Alternatively, there may be only one CogniSensor and/or one light element 1301. Further, CogniSensor 104 may include an array of CogniSensors as shown in FIG. 5A or may include an array of CogniSensor Arrays as shown in FIG. 5C. As shown in FIG. 14B, intelligent lighting unit 1400 may also include a filler layer 1310 located between substrate 102 and cover layer 1311. Filler layer 1310 may include conductors directly engraved or diffused on substrate 102 configured to supply power and/or carry signals to and/or from one or more Cognisensors 104 and to and/or from one or more light elements 1301.

As shown in FIG. 14C, CogniSensors 104 may receive light transmitted through transparent or semi-transparent substrate 102, and light elements 1301 may emit light through substrate 102. However, one or more light elements 1301 may be emit light though cover glass 1311 instead.

In operation, an intelligent lighting unit 1400 may control the light emitted from light elements based on patterns detected in the field of view of CogniSensors 104. For example, intelligent lighting unit 1400 may turn on or increase the intensity of light emitted by one or more light elements 1301 in response to CogniSensors 104 detecting that one or more people are present in the CogniSensors' field of view. Similarly, intelligent lighting unit 1400 may turn off or dim (i.e., reduce the intensity of light emitted by) one or more light elements 1301 in response to CogniSensors 104 detecting that no people are present in the CogniSensors' field of view.

One or more light elements may be controlled in response to behavior recognized by intelligent lighting unit 1400. For example, an intelligent lighting unit 1400 may recognize that a person has opened a book and, in response, increase the intensity of light directed toward the book. An intelligent lighting unit may turn off or dim one or more light elements 1301 in response to one or more CogniSensors 104 recognizing that one or more persons in the field of view have laid down in a bed. If one or more CogniSensors 104 in an intelligent light unit 1400 has been trained to recognize when one or more persons have collapsed, the intelligent light unit could change the color of light emitted by the one or more light elements 1301 (e.g., change the color of light emitted to red).

Further, the results of the pattern recognition may be transmitted outside of intelligent lighting unit 1400. An intelligent lighting unit 1400 that has recognized that a person has collapsed may notify emergency personnel. In a hotel setting, in addition to dimming or turning off one or more light elements 1301, intelligent lighting unit 1400 could inform the front desk and/or cleaning staff that people are no longer in the room. Also, intelligent lighting unit 1400 could signal fans, air conditioners and/or heaters to shut off when guests are no longer present.

In a prison setting, intelligent lighting unit 1400 may be used to recognize and output the number of inmates in a cell. Intelligent lighting unit 1400 may be used to recognize when a fight is in progress or when an inmate needs medical attention. Intelligent lighting unit 1400 could also set off an alarm, change the color of the light emitted by one or more light elements 1301, and/or notify prison staff when the number of inmates in a cell is more or less than an expected amount, a fight is in progress, or medical attention is needed.

Furthermore, because intelligent lighting unit 1400 performs pattern recognition locally, transmission of images or video is not necessary, and intelligent lighting unit 1400 recognizes behavior without intruding on people's privacy.

Intelligent lighting unit 1400 may also be used in a window pane in a greenhouse or other building. One or more CogniSensors 104 may detect the amount of light outside the building and control one or more light elements 1301. For instance, an intelligent light unit 1400 may be used in a greenhouse to turn on one or more light elements 1301 to provide additional light on cloudy days while keeping the one or more light elements 1301 turned off on sunny days. Also, intelligent light unit 1400 may be used as a window on the ceiling or wall of a building. For instance, when used as a window, the intelligent light unit 1400 may simply appear as a transparent or semi-transparent window while the one or more CogniSensors 104 receive more than a certain amount of light, but the intelligent light unit 1400 may provide lighting while the one or more CogniSensors 104 receive less than the certain amount of light. In these embodiments, intelligent light unit 1400 may use the configuration of light elements 1301 and CogniSensors 104 shown in FIG. 13D.

Figure 15A:
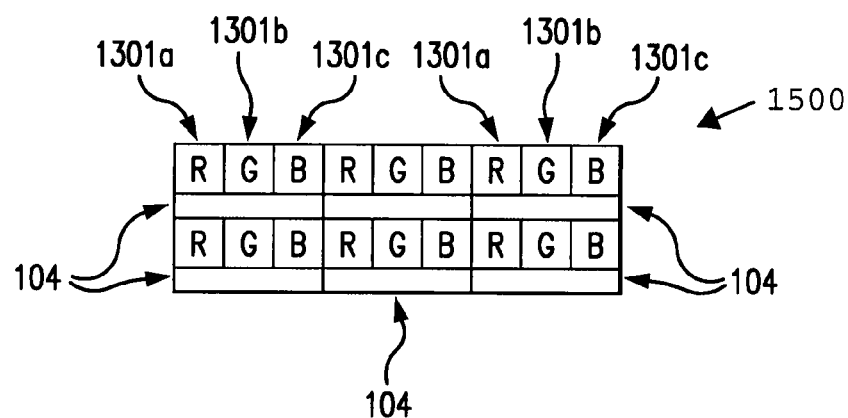
FIGS. 15A and 15B illustrate an embodiment of an intelligent display having sensors and light elements disposed in or on the same transparent or semi-transparent substrate.
Figure 15B:
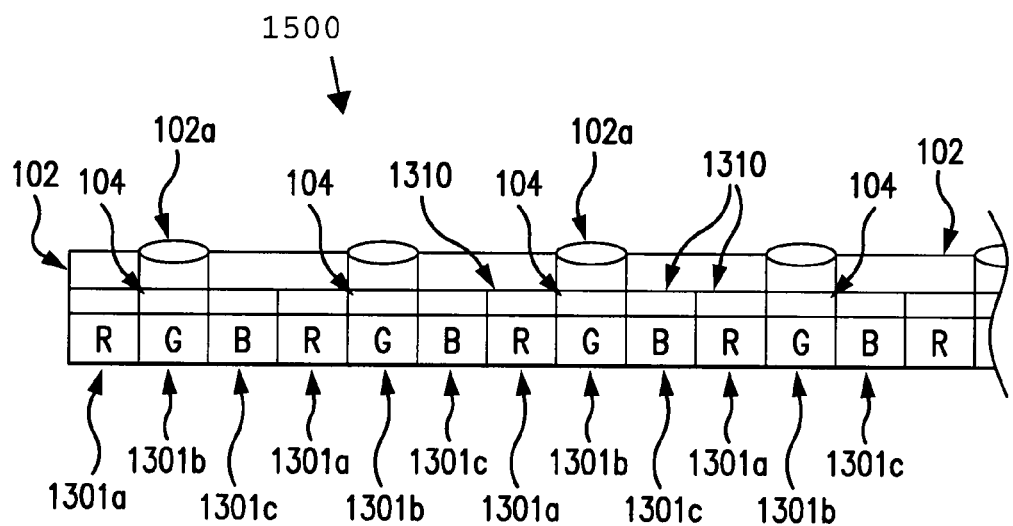

FIGS. 15A and 15B illustrate example configurations of one or more light elements 1301 and one or more CogniSensors 104 in an intelligent display 1500. Like the embodiments shown in FIGS. 1-7, intelligent lighting display 1500 has a transparent or semi-transparent substrate 102, and one or more CogniSensors 104 are embedded in or positioned on substrate 102. In addition, one or more light elements 1301 are embedded in or positioned on substrate 102. Light elements 1301 are geometrically arranged and configured to form images. The images formed may be displayed to objects in the field of view of one or more CogniSensors 104. The images displayed may include a sequence of images (e.g., video). Intelligent display 1500 may have an input/output unit through which images to be displayed may be received and through which pattern recognition information may be sent. Input/output unit may send and receive signals wirelessly. Here again, because the one or more Cognisensors 104 and light elements 1301 are in or on the same substrate 102, the intelligent display 1500 may be thin and compact. Also, because CogniSensors 104 may be spread over the entire display, CogniSensors 104 may have a large sensing area and be able to detect and recognize patterns even when objects are standing very close to the substrate 102 of the display 1500.

An array of CogniSensors 104 and light elements 1301 that may be embedded in or positioned on substrate 102 according to one embodiment of an intelligent display 1500 is shown in FIG. 15A. In this embodiment, CogniSensors 104 and light elements 1301 are arrayed in alternating rows of CogniSensors 104 and light elements 1301. In this embodiment, pixels 1301a-1301c are used as light elements 1301, and each pixel may produce light of a different color. For example, light elements 1301 may include red pixels 1301a, green pixels 1301b and blue pixels 1301c. Red pixels 1301a may produce red light, green pixels 1301b may produce green light, and blue pixels 1301c may produce blue light. Each CogniSensor 104 may control one or more sets of one or more red pixels 1301a, one or more green pixels 1301b and one or more blue pixels 1301c so that, when added together, a broad range of colors may be produced. Each CogniSensor 104 may control the intensity and/or color of an adjacent set of pixels 1301a-1301c and/or non-adjacent sets of pixels 1301a-1301c.

An array of CogniSensors 104 and light elements 1301 that may be embedded in or positioned on substrate 102 according to another embodiment of an intelligent display 1500 is shown in FIG. 15B. In this embodiment, red pixels 1301a, green pixels 1301b and blue pixels 1301c are used as light elements 1301. CogniSensors 104 are embedded in or positioned on transparent or semi-transparent substrate 102. Lenses 102a embedded in or positioned on substrate 102 may provide an optical path for to CogniSensors 104. A filler of filler layer 1310 may be located between CogniSensors 104. Pixels 1301a-1301c may be located on the side of filler layer 1310 opposite substrate 102. Pixels 1301a-1301c may be configured to emit light away from substrate 102. A transparent or semi-transparent cover layer may be cover pixels 1301a-1301c so that pixels 1301a-1301c and CogniSensors 104 may be located between the cover layer and substrate 102.

Although a specific example of an arrangement of light elements 1301 and CogniSensors 104 is shown in FIG. 15, many other arrangements are possible as will be recognized by persons skilled in the art. For example, pixels 1301a-1301c may form a triangle around each CogniSensor 104. Also, there could be a plurality of sets of pixels 1301a-1301c for each CogniSensor 104.

In operation, an intelligent display 1500 may control the light emitted from light elements based on patterns detected in the field of view of one or more CogniSensors 104. For example, intelligent display 1500 may recognize one or more characteristics (e.g., gender, height, weight, age) of one or more viewers in the field of view of one or more CogniSensors 104, and the characteristics may be used to display targeted advertisements accordingly. In one embodiment, intelligent display 1500 tracks the gaze of one or more viewers and/or recognizes facial expressions, and, in response, images providing more information about products in which a viewer is interested may be displayed. Further, one or more Cognisensors 104 may recognize that a viewer is bored with or dislikes one or more images currently being displayed, the information can be used to display different images to catch the viewer's attention and/or present different advertisements in which the viewer might be more interested. The patterns recognized by one or more CogniSensors 104 may be output and used to determine what images, advertisements and/or products generated the most favorable responses in viewers.

In the context of storefront advertising, intelligent display 1500 may allow a window shopper to see into the store through intelligent display 1500, track the gaze of the storefront shopper, and display information (e.g., promotional materials, price, available sizes, etc) about the merchandise at which the window shopper looks. Inside stores, an intelligent display 1500 may be used both to display advertisements and to recognize an occurrence of shoplifting.

Intelligent display 1500 may also be used as a mirror to render the image received by one or more CogniSensors 104. Thus, a viewer looking at intelligent display 1500 would see themselves. Intelligent display 1500 could then modify the image for entertainment and/or advertising value. For example, a viewer could be shown wearing an advertiser's new line of clothing and/or could be shown in another location.

One or more Cognisensors 104 of intelligent display 1500 may also be used to recognize the location of and distance from display 1500 of various body parts of a viewer. This information may be used for interactive video games or to control the intelligent display. For example, one or more CogniSensors 104 of intelligent display 1500 may recognize certain body movements as instructions to turn off the display, to change the channel or input being displayed, or to adjust the volume. In addition, because CogniSensors 104 may be arranged over the entire substrate 102 and have a large sensing area, CogniSensors 104 may detect and recognize objects even when located very close to the substrate 102.

Here again, because intelligent display 1500 performs pattern recognition locally, transmission of images or video is not necessary, and intelligent displays 1500 may recognize behavior without being intruding on people's privacy. Accordingly, intelligent displays 1500 may also be used to determine television ratings (e.g., how many people are watching and/or whether the viewer(s) is enjoying a program).

Intelligent display 1500 may also be used for intelligent eyewear to enhance the image seen by a user wearing the eyewear. For example, eye glasses, sunglasses or contact lenses may have a transparent or semi-transparent substrate in or on which one or more CogniSensors 104 are embedded or positioned. CogniSensors 104 may be configured to detect and recognize patters in the light received by the CogniSensors 104. Light elements 1301, which may be pixels 1301a-1301c, may be controlled in accordance with the patterns recognized by the CogniSensors 104 to enhance the images seen by the wearer of the intelligent eye wear. For example, intelligent eye wear may be used to highlight possible weapons or threats, display names of recognized faces, display distances to recognized objects, highlight moving objects or roads, add symbols and/or display names of landmarks. As a result, the wearer of the intelligent eyewear may see an augmented reality, and the eyewear may provide an infinite screen (i.e., patterns may be detected and recognized regardless of the direction in which the wearer looks).

In any of the embodiments described herein, substrate 102 may be a flat plane oriented horizontally or vertically but may also by curved and/or oriented at any angle. Power may be supplied wirelessly by means of one or more photovoltaic devices embedded in or attached to substrate 102. Also, each Cognisensor 104 may communicate over the same line(s) used to supply power to the Cognisensor 104. Further, output transmission lines and/or power supply lines may be directly engraved or diffused on substrate 102.

As should be apparent to one skilled in the art, the imaging device of the present invention may be useful in innumerable other applications not listed here. For example, another application includes permanent damage detection (texture change) in dam, bridge or other manmade construction. Implementation of such application should be apparent from the above description of embodiments of the present invention. Further, power and signal transmission could be wireless (e.g., infra red, photocell, induction loop, etc.).

Thus, a number of preferred embodiments have been fully described herein with reference to the drawing figures. Although the invention has been described based upon these preferred embodiments, it would be apparent to those of skill in the art that certain modifications, variations, and alternative constructions could be made to the described embodiments within the spirit and scope of the invention.

What is claimed is:

1. An image recognition device comprising:
   a plurality of cognitive sensors embedded in or positioned on a transparent or semi-transparent substrate, each sensor comprising:
      a photosensitive element; and
      a trainable cognitive memory cell associated with the photosensitive element;
   a plurality of optical interfaces formed on or embedded in said substrate, each one of said plurality of optical interfaces optically coupled to a corresponding one of said plurality of cognitive sensors; and
   a plurality of light elements positioned on said substrate and configured to emit light.

2. The image recognition device of claim 1, wherein the light output by one or more of the plurality of light elements is controlled in accordance with an output from one or more of the plurality of cognitive sensors.

3. The image recognition device of claim 1, wherein the plurality of light elements is geometrically arranged to form an image display apparatus.

4. The image recognition device of claim 3, wherein the image display apparatus is configured to display an image representing light received on the photosensitive elements of one or more of the plurality of cognitive sensors.

5. The image recognition device of claim 3, wherein each cognitive sensor is trainable and configured to recognize patterns based on incident light; and
   the image display apparatus is configured to display an image and to modify the image in accordance with patterns recognized by one or more of the plurality of cognitive sensors.

6. The image recognition device of claim 1, wherein the plurality of cognitive sensors have a field of view, and the light elements are configured to emit light in the field of view.

7. The image recognition device of claim 1, wherein the plurality of cognitive sensors have a field of view, and the light elements are configured to display an image which is visible by objects in the field of view.

8. The image recognition device of claim 1, wherein the plurality of cognitive sensors have a field of view, and the light elements are configured to provide lighting to objects in the field of view and to display an image to the objects in the field of view.

9. The image recognition device of claim 8, wherein one or more of the plurality of cognitive elements are configured to recognize patterns of incident light and to control the provision of lighting and image display of one or more of the plurality of light elements as a function of the patterns recognized.

10. The image recognition device of claim 1, wherein each cognitive memory cell is taught to recognize a different portion of an image, and said plurality of cognitive memory cells are configured to operate collectively to recognize said image.

11. The image recognition device of claim 1, wherein each said cognitive memory element comprises a plurality of neurons coupled on an input side thereof by a multiplexed input bus and on an output side thereof by an output bus, each said neuron being taught with a knowledge, said knowledge allowing the corresponding neuron to recognize a signal and perform a decision.

12. The image recognition device recited in claim 1, wherein the plurality of cognitive sensors are configured to perform image recognition operations digitally without a software program through a plurality of parallel elements each having self contained, autonomous behavior.

13. The image recognition device recited in claim 1, wherein light elements of the plurality of light elements are selected from light emitting diodes (LEDs), organic LEDs and plasma cavities.

14. The image recognition device of claim 1, further comprising photovoltaic devices embedded in or positioned on said substrate.

15. The image recognition device of claim 1, further comprising output transmission lines and power supply lines that are directly engraved or diffused on said substrate.

16. The image recognition device of claim 1, wherein each of the plurality of cognitive sensors is configured to receive power from power supply lines and to output communications using the power supply lines.

17. The image recognition device of claim 1, further comprising a transparent or semi-transparent cover layer, wherein the plurality of cognitive sensors and the plurality of light elements are arranged between the cover layer and the substrate.

18. The image recognition device of claim 17, wherein one or more of the plurality of light elements is configured to emit light through the substrate.

19. The image recognition device of claim 17, wherein one or more of the plurality of light elements is configured to emit light through the cover layer.

20. The image recognition device of claim 1, wherein the plurality of light elements and plurality of cognitive sensors are arranged in rows and columns, wherein the plurality of light elements and plurality of cognitive sensors alternate in each row and alternate in each column.

21. The image recognition device of claim 1, wherein the plurality of light elements and plurality of cognitive sensors are arranged so that each of the plurality of cognitive sensors is surrounded by light elements.

22. The image recognition device of claim 1, wherein the plurality of light elements comprise red pixels, green pixels and blue pixels.

23. An image recognition device comprising:
   a transparent or semi-transparent substrate;
   a plurality of cognitive sensors embedded in or positioned on the substrate, each sensor comprising:
      a photosensitive element; and
      a trainable cognitive memory cell associated with the photosensitive element;
   a plurality of optical interfaces formed on or embedded in said substrate, each one of said plurality of optical interfaces optically coupled to a corresponding one of said plurality of cognitive sensors;
   a filler layer comprising a filler between adjacent cognitive sensors of the plurality of cognitive sensors; and
   a plurality of light elements positioned on said filler layer and configured to emit light.

24. The image recognition device of claim 23, wherein the plurality of light elements comprise red pixels, green pixels and blue pixels.

* * * * *